(12) United States Patent
Fishman et al.

(10) Patent No.: US 6,741,905 B1
(45) Date of Patent: May 25, 2004

(54) VISUAL SYSTEM FOR PROGRAMMING OF SIMULTANEOUS AND SYNCHRONOUS MACHINING OPERATIONS ON LATHES

(75) Inventors: Lena Fishman, Maple Glenn, PA (US); Hanan Fishman, Philadelphia, PA (US)

(73) Assignee: IMCS, Inc., Fort Washington, PA (US)

( * ) Notice: Subject to any disclaimer, the term of this patent is extended or adjusted under 35 U.S.C. 154(b) by 0 days.

(21) Appl. No.: 10/079,764

(22) Filed: Feb. 21, 2002

Related U.S. Application Data

(60) Provisional application No. 60/271,101, filed on Feb. 24, 2001.

(51) Int. Cl.$^7$ ............................................. G06F 19/00
(52) U.S. Cl. ........................ 700/180; 700/83; 700/86; 700/169; 142/3
(58) Field of Search ................................ 700/180, 169, 700/83, 86, 182, 95, 159, 175; 82/159, 129; 142/3

(56) References Cited

U.S. PATENT DOCUMENTS

| | | | | | |
|---|---|---|---|---|---|
| 4,321,845 | A | * | 3/1982 | Szabo et al. ................... | 82/159 |
| 6,092,446 | A | * | 7/2000 | Hardesty ........................ | 142/3 |
| 6,112,133 | A | * | 8/2000 | Fishman ...................... | 700/182 |
| 6,286,402 | B2 | * | 9/2001 | Crudgington et al. ......... | 82/129 |
| 6,366,300 | B1 | * | 4/2002 | Ohara et al. .................. | 700/83 |

OTHER PUBLICATIONS

Author: IMCS Inc.; Item Title: "PartMaker® SwissCAM™ User Guide Version 4.4.3"; Date Published: Oct., 2000; pp.: 74 double–sided sheets numbered: cover sheet/software license agreement; index i through x; Introduction (6 sheets not numbered); Chapter 1: 1–1 to 1–10; Chapter 2: 2–1 to 2–29; Chapter 3: 3–1 to 3–69; and Chapter 4: 4–1 to 4–19; Publisher: IMCS Inc., Fort Washington, Pennsylvania.

Author: Hanan Fishman, Article Title: "CAM Selection Criteria for your Swiss–type", Item Title: Production Machining Magazine; Date Published: Jan. 2001; pp.: 4–page reprint numbered 1 through 4; Issue: Jan./Feb. 2001; Publisher: Gardner Publications, Inc., Cincinnati, Ohio.

Author: EDITORIAL; Article Title: "Swiss–Type Software", Item Title: Automatic Machining Magazine; Date Published: Sep. 2001; pp.: 1 page numbered 60; Issue: Sep. 2001; Publisher: Screw Machine Publishing Co. Inc., Webster, New York.

Author: Jim Destefani, Article Title: "Turn Up Productivity With Turm/Mill Machines"; Manufacturing Engineering; Date Published: Oct., 2001; pp.: 8 pages numbered 104, 106, 108, 110, 111, 112, 114 and 115; Issue: vol. 127, No. 4, Oct., 2001; Publisher: Society of Manufacturing Engineers, Dearborn, Michigan.

Author: EDITORIAL; Article Title: "Getting the Most From A CNC Swiss–Type"; Item Title: Production Machining Magazine; Date Published: Jan. 2002; pp.: 2 page reprint numbered 1 and 2; Issue: Jan./Feb. 2002; Publisher: Gardner Publications, Inc., Cincinnati, Ohio.

Author: EDITORIAL; Article Title: "PartMaker Version 4.7"; Item Title: Metalworking Equipment News Magazine; Date Published: Sep. 2001: pp.: 1 page numbered 60; Issue: Sep. 2001; Publisher: Fabricating & Metalworking, Birmingham, Alabama.

* cited by examiner

*Primary Examiner*—Albert W. Paladini

(57) ABSTRACT

A system and method allows visual programming of simultaneous and synchronous machining operations on multi-axis lathes. The system and method accounts for different combinations of simultaneous and synchronized lathe operations on the spindles which can utilize multiple tools. A graphic synchronization icon is assigned to each mode that preferably represents the lathe operation. Appropriate synchronous operations are grouped together in synchronization groups. The system and method are universal since a post-processor processes the synchronization modes and synchronization groups, and translates them for use with computer programs understood by a particular CNC lathe.

23 Claims, 18 Drawing Sheets

| PartMaker - Process Table | | | | | | | | | | |
|---|---|---|---|---|---|---|---|---|---|---|
| Proc ID | Tool ID | Tool No. | Tool Name | Proc Task | Group | Face | Feed | Speed | Time | Sync Code | Mode |
| 1 T001 | 12/Gang | OD Turn | OD_Finish | 1 | Main Spindle | 0.0010upr | 318fpm | 0.06 | 1 | M2SF |
| 2 T001 | 12/Gang | OD Turn | OD_Finish | 2 | Main Spindle | 0.0010upr | 318fpm | 0.11 | 1 | M2SF |
| 3 T007 | 13/Gang | Threadin | OD_Thread | 3 | Main Spindle | 0.0179upr | 5000rpm | 0.04 | 2 | M1SN |
| 4 T001 | 12/Gang | OD Turn | OD_Finish | 4 | Main Spindle | 0.0010upr | 318fpm | 0.13 | 2 | M1SN |
| 5 T002 | 14/Gang | BackTurn | OD_Finish | 5 | Main Spindle | 0.0010upr | 452fpm | 0.07 | 2 | M1SN |
| 7 T006 | 16/Gang | End Mill | Contour Rough | 1 | Mill-Hex | 3.8upm | 4261rpm | 0.93 |  | M1S0 |
| 8 T003 | 21/Gang | OD Turn | OD_Finish | 1 | Sub Spindle | 0.0010upr | 318fpm | 0.06 |  | M0S1 |
| 9 T003 | 21/Gang | OD Turn | OD_Finish | 2 | Sub Spindle | 0.0010upr | 318fpm | 0.02 |  | M0S1 |
| 10 T005 | 22/Gang | Spot Drill | SPOT FACE | 3 | Sub Spindle | 0.0015upr | 1778rpm | 0.05 | 3 | M1SD |
| 11 T008 | 23/Gang | Drill Carb | DRILL | 3 | Sub Spindle | 0.0100upr | 5000rpm | 0.09 | 3 | M1SD |
| 12 T009 | 24/Gang | Tap 0-80 | RIGID TAP | 3 | Sub Spindle | 0.0125upr | 5000rpm | 0.02 | 4 | M1S1 |
| 6 T004 | 11/Gang | Cut-off | OD_Finish | 6 | Main Spindle | 0.0010upr | 452fpm | 0.06 | 4 | M1S1 |

Material File: St_carb.mdb    Main Spindle Time: 2.90 min.    Sub Spindle Time: 1.25 min.

Default View

FIG. 3(a)

| PartMaker - Process Table | | | | | | | |
|---|---|---|---|---|---|---|---|
| Proc ID | Tool ID | Tool No. | Tool Name | G | Face | Mode | Sync Group ↓ |
| P01 | T002 | 22/Turret | spot-front | | 1. main-turn | M1SD | 1 |
| P12 | T011 | 122/Turret | spot-back | | 1. sub-turn | M1SD | 1 |
| P02 | T013 | 23/Turret | drill .113-front | | 1. main-turn | M1SD | 2 |
| P13 | T014 | 123/Turret | drill .113-back | | 1. sub-turn | M1SD | 2 |
| P03 | T001 | 222/Turret | drill .119-front | | 1. main-turn | M1SD | 3 |
| P14 | T010 | 322/Turret | drill .119-back | | 1. sub-turn | M1SD | 3 |
| P04 | T015 | 24/Turret | broach .121-front | | 1. main-turn | M1SD | 4 |
| P15 | T016 | 27/Turret | broach .121-back | | 1. sub-turn | M1SD | 4 |

FIG. 15

| PartMaker - Process Table | | | | | | |
|---|---|---|---|---|---|---|
| Proc ID | Tool ID | Tool No. | Tool Name | Group /Feature | Mode | Sync Group ↓ |
| P01 | T062 | 3/Gang | OD Turn-55-Gang | 1/ROUGH FACE | M2SF | 1 |
| P02 | T063 | 22/Turret | OD Turn-55-Tur | 2/F.FACE | M2SF | 1 |
| P03 | T062 | 3/Gang | OD Turn-55-Gang | 3/ROUGH TURN | M2SN | 2 |
| P04 | T063 | 22/Turret | OD Turn-55-Tur | 4/F. TURN | M2SN | 2 |

FIG. 16

| PartMaker - Process Table | | | | | | | |
|---|---|---|---|---|---|---|---|
| Proc ID | Tool ID | Tool No. | Tool Name | Group/Feature | Mode | Sync Group ↓ | |
| P01 | T062 | 3/Gang | GANG-55DEG | 1/ROUGH FACE | M2S1 | | 1 |
| P02 | T063 | 22/Turret | TRT-55DEG. | 2/F.FACE | M2S1 | | 1 |
| P09 | T071 | 41/Back | Drill_.1 | 1/Drill_0.1 | M2S1/E | | 1 |

FIG. 17

| PartMaker - Process Table | | | | | | | |
|---|---|---|---|---|---|---|---|
| Proc ID | Tool ID | Tool No. | Tool Name | Group/Feature | Face | Mode | Sync Group ↓ |
| P06 | T003 | 12/Gang | turn.005r-main | 3/front turn | main-turn | M2SD | 1 |
| P02 | T013 | 23/Turret | drill.113-front | 1/main-drill.119 | main-turn | M2SD | 1 |
| P13 | T014 | 123/Turret | drill.113-back | 1/sub-drill.119 | sub-turn | M2SD | 1 |

FIG. 18

| Primary Main Spindle Process in M2S0 mode | Secondary Main Spindle Process in M2S0 mode |
|---|---|
| G720<br>*(PROCESS P01 FRONT-ROUGH)*<br>G50 X-0.02 Z0.43<br>G0 Z-.05<br>X4.0<br>T0100 (OD-ROUGHER)<br>G97 S1=5846 M3 M96<br>G99 G0 Z-0.1408 T01<br>X0.3217<br>G96 S498 M97<br>G1 X0.0388 Z0.0006 F0.0002<br>X0.0488 Z0.0056<br>G2 X0.05 Z0.007 R0.002<br>G1 Z0.2332<br>X0.0862 Z0.2513<br>G2 X0.0874 Z0.2527 R0.002<br>G1 Z0.482<br>X0.3772 Z0.5208<br>G97 G0 X4.0 T0<br><br>G730 | G720 U1<br>G28 U0<br>G50 X7.05<br>*(PROCESS P02 FRONT-FINISH)*<br>T1200 (OD-FINISHER)<br>G99 G0 Z-0.1408 T01<br>X0.3217<br>G1 X0.0388 Z0.0006 F0.0002<br>X0.0488 Z0.0056<br>G2 X0.05 Z0.007 R0.002<br>G1 Z0.2332<br>X0.0862 Z0.2513<br>G2 X0.0874 Z0.2527 R0.002<br>G1 Z0.482<br>X0.3772 Z0.5208<br>G97 G0 X7.05 T0<br><br>G730 U1 W1 |

FIG. 19

| Primary Main Spindle Process in M2S0 mode | Secondary Main Spindle Process in M2S0 mode |
|---|---|
| N1 *(PROCESS P01 FRONT-ROUGH)*<br>M404<br>T102 (OD-ROUGHER)<br>G50 S8000<br>G96 S498 M3<br>G0 Z-0.1408 T01<br>X0.3217<br>M140 (Z1-E SYNC ON + WAIT)<br>G1 X0.0388 Z0.0006 F0.001<br>X0.0488 Z0.0056<br>G2 X0.05 Z0.007 R0.002<br>G1 Z0.2332<br>X0.0862 Z0.2513<br>G2 X0.0874 Z0.2527 R0.002<br>G1 Z0.482<br>X0.3772 Z0.5208<br>G0 G97 G40<br>G28 U0 T0<br>M408<br>G50 S8000<br>G96 S498 M3<br>M1 | N2 *(PROCESS P02 FRONT-FINISH)*<br>M404<br>T1202 (OD-FINISHER)<br>G141 (E FOLLOWS Z1)<br>G0 E-0.1408 T01<br>Y0.3217<br>G1 Y0.0388 E0.0006 F0.001<br>Y0.0488 E0.0056<br>G2 Y0.05 E0.007 R0.002<br>G1 E0.2332<br>Y0.0862 E0.2513<br>G2 Y0.0874 E0.2527 R0.002<br>G1 E0.482<br>Y0.3772 E0.5208<br>G28 V0 T0<br>G140<br>M408<br>M1 |

FIG. 20

VISUAL SYSTEM FOR PROGRAMMING OF SIMULTANEOUS AND SYNCHRONOUS MACHINING OPERATIONS ON LATHES

CROSS REFERENCE TO RELATED APPLICATIONS

This application claims the benefit of U.S. Provisional Application No. 60/271,101, filed Feb. 24, 2001.

FIELD OF THE INVENTION

The present invention generally relates to a Computer Aided Manufacturing (CAM) system and method for automatic programming of lathes, such as multi-axis, computer numerically controlled (CNC) lathes for working on a fixed stock, and CNC Swiss-type lathes for working on a sliding stock. The system and method provides for the automatic production of a program that simultaneously controls a plurality of lathe processes for machining one or more workpieces by synchronous operation of a plurality of cutting tools and/or spindles. The system and method utilizes graphic symbols or icons to visualize data entry for combined and synchronized operations in different synchronous modes. These modes are automatically converted by the system and method of the present invention into executable CNC code for specific CNC machines.

BACKGROUND OF THE INVENTION

A fabricated machine part is cut from a piece of material (blank stock or workpiece) having an original shape that is different from the final machined part. The machine can use various types of cutting tools to chip away all unnecessary material and shape the surface of the workpiece to that of the final part. When the machine is a lathe, the most common lathe operations or processes employed during fabrication of the part are facing, turning, grooving, threading and drilling of axial holes. A turning lathe spins the workpiece while plunging a tool with a non-rotating cutting edge (referred to as a fixed tool) into the workpiece to cut it. A variety of drilling and milling machines chip away material from the workpiece by plunging a tool with a rotating cutting bit (referred to as a rotary, or live, tool) having spinning cutting edges into the workpiece to cut it. Modern CNC lathes can be configured to perform milling and drilling of non-axial holes with rotary tools.

In the not so distant past all these operations were manually controlled. For example, a cylindrical surface was made on a lathe by holding a non-cylindrical stock in a rotating chuck and manually moving a cutting tool parallel and perpendicular to the stock's axis of rotation. To make a hole, a machinist would fasten the workpiece to a stationary table, align the drill bit with the location of the desired hole, and lower the proper diameter rotating drill bit until a hole of the correct depth was produced. To make a slot, a rotating milling bit was first plunged into the stock's surface, and then the stock was moved horizontally along the path of the desired slot.

FIG. 1(a) diagrammatically illustrates one example of a modern multi-axis CNC lathe 100. For purposes of describing lathe processes, a non-limiting orientation of general orthogonal axes X, Y and Z, and rotational directions A, B and C, about those axes, respectively, is illustrated in FIG. 1(a), with the Y-axis being perpendicular to the plane of the drawing sheet, and the positive direction of the Y-axis being towards the viewer. First workpiece 102 can be fed through main spindle 104, along the Z1-axis, in either the positive or negative direction. Guide bushing 106 can be used to support workpiece 102 as it is fed through the main spindle. Workpiece 102 can be rotated in the C1-direction about the Z1-axis by main spindle 104. Tool post 108 holds a plurality of cutting tools. The tools are aligned along the Y1-axis in FIG. 1(a), and therefore, only first cutting tool 110 is visible in the figure. The tools may be fixed or rotary tools, or a mix of these two types. Generally one tool from the tool post is actively working on workpiece 102 at a time. Tool post 108 is indexed for selection of the current active tool by moving the tool post along the Y1-axis. This type of tool post with linear indexing is sometimes referred to as a gang slide. Tool post 108 moves along the X1-axis so that the indexed active tool makes contact with workpiece 102 to cut into it. For example, moving actively indexed first tool 110 down along the X1-axis will result in cutting edge 111 of the first tool making contact with the workpiece. Tool post 108 may also include tools for working both first workpiece 102 and second workpiece 122 at the same time, such as a double-end drill, as further discussed below. Typically a double-end drill is mounted on a turret-type tool post. Tool post 108 and main spindle 104 may, or may not be, mounted to the same structural element. Sub-spindle 120 can be used either to support first workpiece 102 during main spindle operations, or hold second workpiece 122 while lathe processes are performed on it. Second workpiece 122 is created when the sub-spindle (with no second workpiece) holds the front end 102a of first workpiece 102 while a tool from tool post 108 is used to cut off a portion of the first workpiece (cut-off process) that will form the second workpiece. Sub-spindle 120 can move along the Z2-axis and X2-axis, and rotate second workpiece 122 in the C2-direction around the Z2-axis. Lathe processes on second workpiece 122 in sub-spindle 120 may or may not be performed at the same time as lathe operations on first workpiece 102 in main spindle 104. Tool post 130 holds a plurality of tools 132 that can be indexed so that the active tool can work on the front end 102a of first workpiece 102. In this example, sub-spindle 120 is located on the same slide as tool post 130, and therefore, the tools that are mounted on tool post 130 and sub-spindle 120 share the same coordinate system (X2, Y2, Z2). Tool post 130 is a linearly indexing tool slide that moves along the Z2-axis to engage the front end 102a of first workpiece 102 and indexes tools along the X2-axis. Tool post 130 is sometimes called an end working tool post. Tool post 140 holds a plurality of tools 142 that can be indexed so that an active tool can work on the back end 122b of second workpiece 122. Tool post 140 may be a linearly indexing tool device that moves along the Z3-axis to engage the back end of workpiece 122 and indexes tools along the X3-axis. Alternatively tool post 140 may be a rotary indexing tool device, which is called a turret. The tool turret would move along the Z3-axis to engage the back end of workpiece 122 and index tools by rotating in the C3-direction about the Z3-axis. Rotary (live) tools cutting on the front end or back end of a workpiece are referred to as Z-oriented tools. Rotary tools cutting along the X-axis are sometimes referred to as cross working or X tools. The multi-axis CNC lathe described in FIG. 1(a) is known as a Swiss-type lathe. There are many variants of the Swiss-type lathe shown in FIG. 1(a). For example, a particular lathe may have a further multiplicity of tool posts for working on stock and/or two or more sub-spindles.

FIG. 1(b) illustrates one variant of the multi-axis CNC lathe shown in FIG. 1(a). Lathe 100 in FIG. 1(a) is known as a left hand lathe, since main spindle 104 is oriented to the left of sub-spindle 120. Conversely lathe 101 in FIG. 1(b) is known as a right hand lathe since main spindle 104 is oriented to the right of sub-spindle 120.

FIG. 1(c) illustrates another variant of a multi-axis CNC lathe that is sometimes called a turning center or turn-mill center. CNC lathe 99 in FIG. 1(c) is used to produce a part having curvilinear inner and outer surfaces of revolutions, such as solid or hollow cylinders, cones, semi-spheres, or a part with surface features created by rotational movement of the part including grooves and threads. To create a round surface, main spindle 105 rotates first workpiece 103 in the C1-direction about the Z-axis while an indexed cutting tool, such as tool 115 or tool 117, moves along the X-axis and Z-axis in a plane coincident to the workpiece's rotational axis to engage and cut the first workpiece. Sub-spindle 119 can be used to support the front end of workpiece 103 or hold a second workpiece 123 while lathe processes are performed on it. Sub-spindle 119 can rotate workpiece 123 in the C2-direction about the Z-axis, while an indexed cutting tool, such as tool 118 or tool 121, moves along the X-axis and Z-axis in a plane coincident to the workpiece's rotational axis to engage and cut the second workpiece. In the non-limiting configuration shown in FIG. 1(c), either one tool from tool turret 107 or 109, or two tools in simultaneous use, one from each of these two turrets, may be used to cut first workpiece 103. Similarly, either one tool from tool turrets 112 or 114, or two tools in simultaneous use, one from each of these two turrets, may be used to cut second workpiece 123. The plurality of tools on each of the tool turrets are indexed by rotation about the turret's centerline. A twin-turret, twin-spindle turn-mill center in this example is similar to a Swiss-type lathe in the sense that it can also use bar stock, a workpiece cut-off process, workpiece transfer from the main to the sub-spindle, and simultaneous machining of a first workpiece on the main spindle and a second workpiece on the sub-spindle. For present technology, Swiss-type lathes are most often used to produce parts with a relatively small cross section and long length, typically with a ratio of 3:1 (length-to-cross section) or greater. This is why a guide bushing is essential for support of a workpiece during machining on a Swiss-type lathe. Without the guide bushing the workpiece is susceptible to bending. Conversely turn-mill centers are used for machining larger parts. Also, a turn-mill center can be used to machine a discrete part that is clamped in a spindle, as opposed to a Swiss-type lathe, that can use a continuously feed bar stock. As technology progresses, it is likely that the operational differences between a Swiss-lathe and turn-mill center will become less distinct. For the purpose of defining the synchronous modes and visual CAM system of the present invention, there is no significant differences between a Swiss-type lathe and a turn-mill center. For the purposes of the present invention, both a Swiss-type lathe and turning center can be defined as a multi-axis lathe.

FIG. 1(d) illustrates another variant of a multi-axis CNC lathe that has a single spindle 105 and two tool turrets 107 and 109. In this configuration either one tool from either of the two turrets, or two tools in simultaneous use, one from each of the two tool turrets, may be used to cut workpiece 103.

Each mechanism (i.e., main spindle, sub-spindle, linear tool slide, tool turret, individual tool and the like) in a multi-axis lathe is controlled by a separate digital servo system and may constitute a separate lathe process. Machining of workpieces to fabricate parts in a multi-axis lathe may involve simultaneous utilization of one, two, three or more active tools for a single, or multiple, workpieces in the main spindle and/or in the sub-spindle. Such versatility not only greatly increases productivity of the machining process, but also facilitates significant improvement in precision. The latter is achieved by minimizing the repositioning of the workpiece when the production process involves moving workpieces that constitute semi-finished parts between several ordinary CNC lathes and mills.

Programming multi-axis lathes in general, and Swiss-type lathes in particular, present a challenge. Programs are primarily manually written. The instructions for every move of each tool and workpiece in the main spindle or a sub-spindle are specifically defined. Not only does each tool path have to be calculated and entered into the numerically controlled computer for the lathe, but in the case of simultaneous multi-tool machining, the operations must also be synchronized. Due to complicated parameters, such as the number of axes, this work is tedious and requires a great deal of concentration and experience. For Swiss-type lathes, all tool movements are referenced to the front edge of the sliding stock, which further complicates programming of the machine tools that are used.

Synchronization of multiple processes on a CNC lathe is implemented in various schemes. U.S. Pat. No. 5,870,306 describes a method based upon priority information that is used to insert specific machine code commands into programs for synchronized processes to force tools and/or spindles to work simultaneously. Another method incorporates special "wait" states, which instructs the faster process to stop and wait until a slower process catches up so that the two processes can be executed simultaneously.

CAM systems specialize in the conversion of the geometrical information for a part's design into CNC code. However, most of these systems have difficulty in handling parts where machining requires that a combination of turning, milling, drilling and threading operations be applied to different surfaces. Most existing CAM systems can only handle one type of machining for one surface.

A visual CAM system (the CAM system) described in U.S. Pat. No. 6,112,133 (the 133 patent), which is incorporated herein in its entirety, divides the part's surface into "a plurality of faces, each face corresponding to a surface of the part defined by the tool and work piece orientation, boundary, and type of machining function". The CAM system has a graphical user interface (GUI) and is capable of automatic G-code generation, either in an off-line computer or in a computer integrated into a multi-axis lathe. Further the 133 patent teaches the identification of machined part features such as holes, slots, pockets, contours, threads, chamfers, bosses or fillets. For each feature, a set of tools and operations, or processes, are then defined. Combined with the geometry information for the part, the set of tools and operations form a group of operations related to machining a part's surface. The CAM system in the 133 patent generates a sequential list of processes in the form of a process table. The method in the 133 patent further includes a machine specific postprocessor that converts general machining information into a specific instruction code for a complex CNC machine.

The 133 patent discloses special synchronization entry to schedule operations to avoid tool collisions from machines with multiple simultaneously operating tool-holding turrets and multiple spindles. See col. 7, lines 27–30 of the 133 patent. Further the 133 patent discloses CNC programs may include special code that synchronize execution of parallel processes. See col. 7, lines 47–49. The 133 patent generally teaches a method of rules for reordering the display rows in the process table to a lathe's operational sequence. However, the 133 patent does not teach the method of how synchronous codes can be entered for various modes of operation of a multi-axis lathe, and how these modes can be classified. Further the 133 patent does not teach a user of the CAM system how these classified synchronous modes can be visually grouped and then translated into final CNC code to execute the synchronous operations on a particular lathe. Without these advantages the user of the CAM system disclosed in the 133 patent must remember the method of the disclosed rules for applying synchronization code. This method is neither easy or intuitive in comparison with a visual graphic system.

Therefore there is the need for classifying all of the synchronous modes of operation of a multi-axis lathe. Further there is a need for a universal system of visual programming of these synchronous modes and arranging them into synchronization groups of priority lathe processes for a multi-axis lathe that can be processed into final CNC code for use with a specific lathe.

BRIEF SUMMARY OF THE INVENTION

In one aspect, the invention is a method of grouping, relative to synchronous execution of lathe operations on a multi-axis lathe, all operations of the lathe. A visual system and method for programming all operations relative to synchronous execution of the lathe operations is provided. Synchronous modes and representative graphic synchronous mode icons are provided in the visual system and method. A visual system and method is provided for selecting a specific synchronous mode and parameters related to a lathe operation associated with the specific synchronous mode.

These and other aspects of the invention are set forth in the specification and appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1(*b*) is a diagrammatic plan of another example of the principal components of a multi-axis CNC Swiss-type lathe.

FIG. 1(*c*) is a diagrammatic plan of one example of the principal components of a CNC turning center.

FIG. 1(*d*) is a diagrammatic plan of another example of the principal components of a CNC turning center.

FIG. 2(*b*) is another example of graphic icons that can be associated with a grouping of synchronous modes of lathe operations for a multi-axis lathe.

FIG. 2(*c*) is one example of graphic icons that can be associated with a grouping of synchronous modes of turning center operations for a turning center.

FIG. 3(*b*) is another example of a process table with a synchronous mode graphic icon associated with each lathe operation in the table.

FIG. 3(*c*) is an example of the process table in FIG. 3(*b*) after lathe operations have been reorganized into synchronization groups.

FIG. 3(*d*) is an isometric view of a part that can be machined on a multi-axis lathe from CNC code generated by a postprocessor from the lathe operations in the process table of FIG. 3(*c*).

FIG. 15 is a typical partial process table illustrating typical synchronous groups created from synchronous mode M1SD lathe operations.

FIG. 16 is a typical partial process table illustrating typical synchronous groups created from synchronous modes M2SF and M2SN lathe operations.

FIG. 17 is a typical partial process table illustrating typical synchronous group created from synchronous mode M2S1 lathe operations.

FIG. 18 is a typical partial process table illustrating typical synchronous group created from synchronous mode M2SD lathe operations.

FIG. 19 illustrates one type of G-code fragments generated by a postprocessor for lathe operations to be executed for one synchronous mode of lathe operations.

FIG. 20 illustrates another type of G-code fragments generated by a postprocessor for lathe operations to be executed for one synchronous mode of lathe operations.

DETAILED DESCRIPTION OF THE INVENTION

Figure 1A:
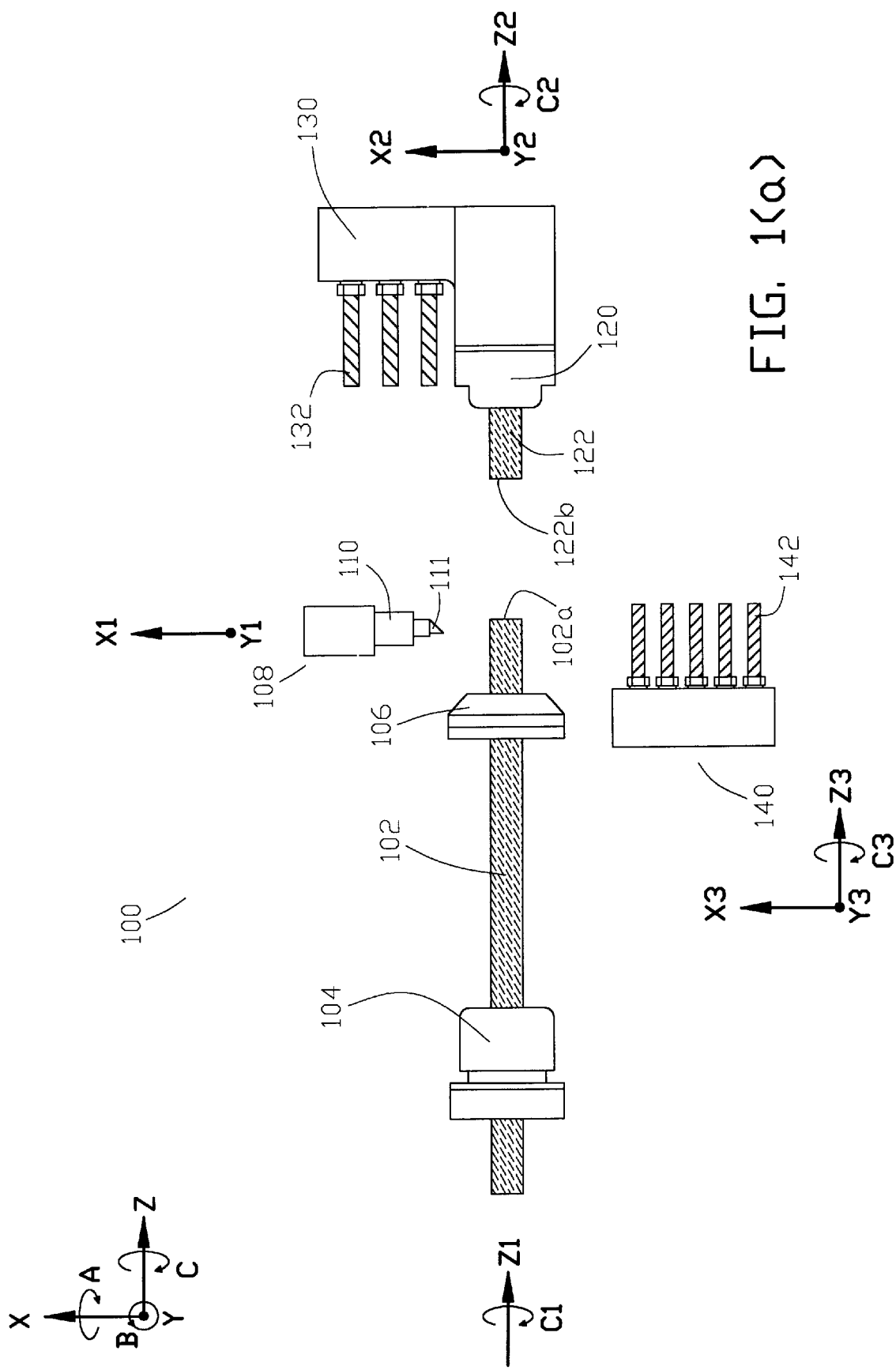
FIG. 1(*a*) is a diagrammatic plan of one example of the principal components of a multi-axis CNC Swiss-type lathe.

For the non-limiting example of the multi-axis CNC lathes illustrated in FIG. 1(*a*) and FIG. 1(*b*), the three possible modes of lathe operation for working stock on main spindle 104 can be designated as set forth in Table 1.

TABLE 1

| Main Spindle Operations | |
|---|---|
| Lathe Operation Mode Designation | Description of Lathe Operation |
| M0 | Idle - No operation performed; no tools in use. |
| M1 | One tool is used from a tool post to cut first workpiece 102. |
| M2 | Two tools are used to cut first workpiece 102, with each of the tools from separate tool posts, such as tool post 108 and tool post 130. |

The five possible modes of lathe operation for supporting stock in main spindle 104 or working stock on sub-spindle 120 in FIG. 1(*a*) and FIG. 1(*b*) can be designated as set forth in Table 2.

TABLE 2

Sub-spindle Operations

| Lathe Operation Mode Designation | Description of Lathe Operation |
|---|---|
| S0 | Idle - No operation performed; no tools in use. |
| SF | First workpiece 102 in the main spindle is supported by the sub-spindle, which follows the workpiece; sub-spindle moves in synchronization with the main spindle as first workpiece is cut. |
| SN | First workpiece 102 in the main spindle is supported by the sub-spindle, which does not follow the workpiece; sub-spindle does not move. |
| S1 | One tool is used from a tool post to cut second workpiece 122. |
| SD | Simultaneous end drilling of first workpiece 102 in the main spindle and second workpiece 122 in the sub-spindle. |

Figure 1B:
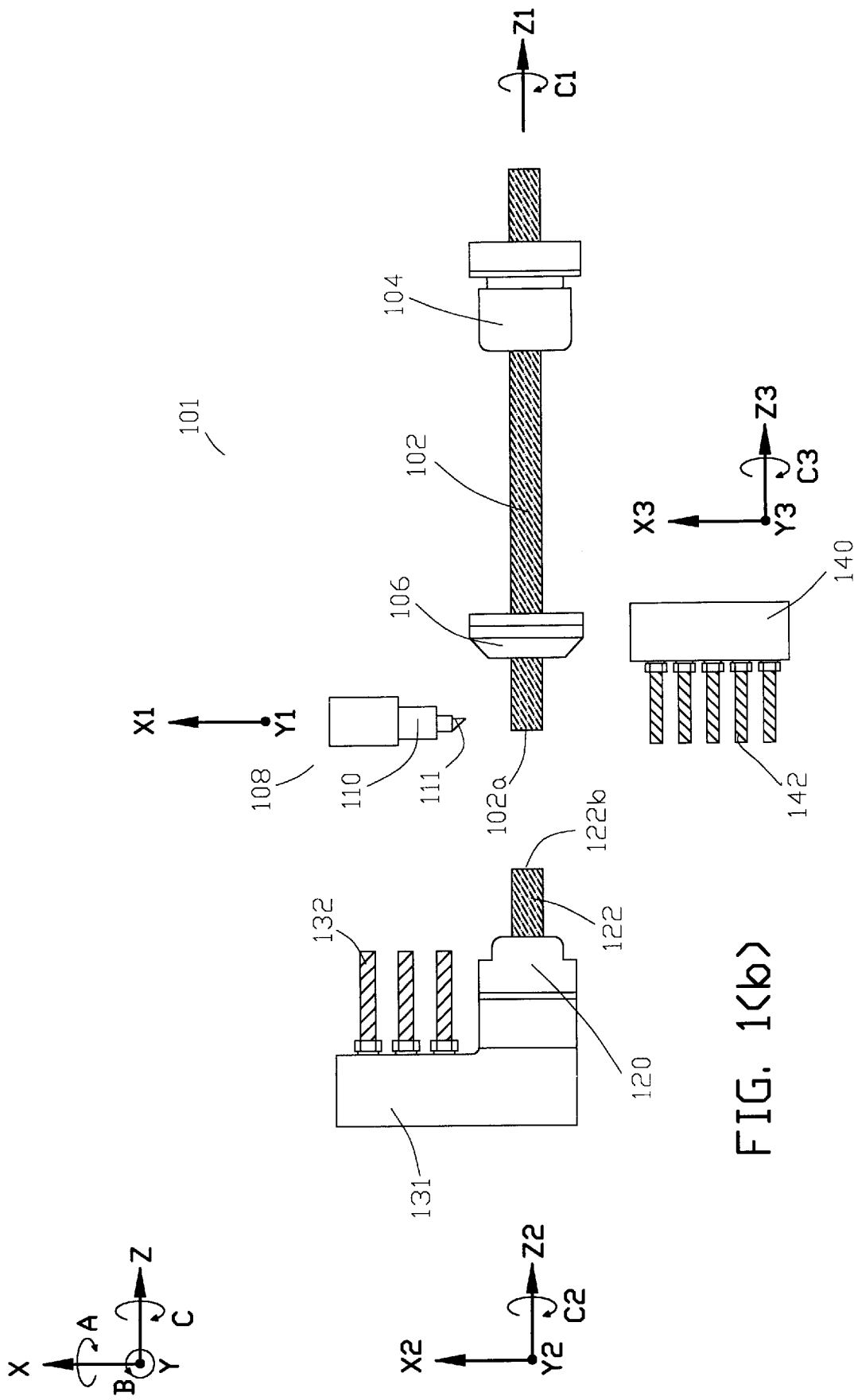
Figure 1C:
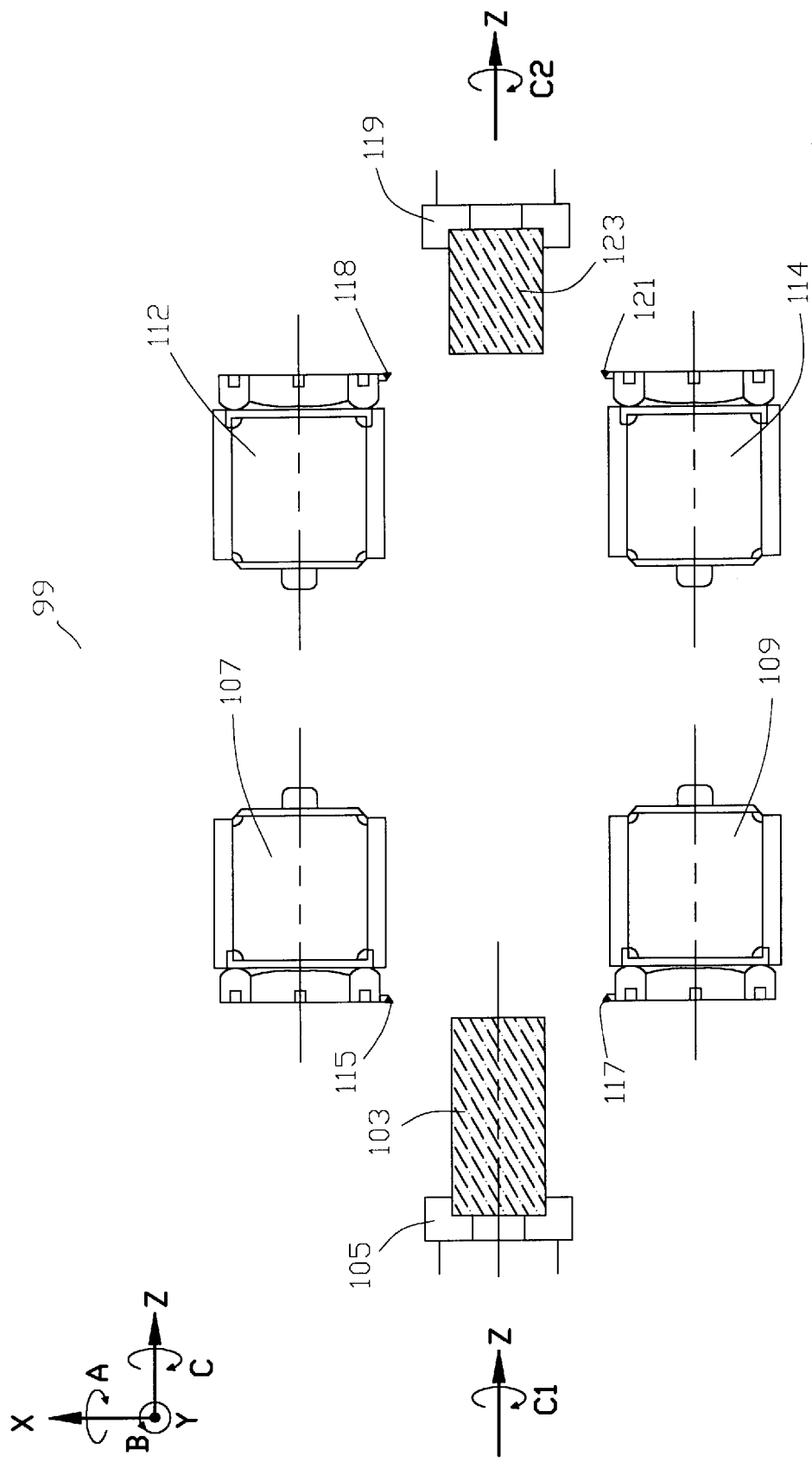

When a plurality of tools are used simultaneously, the above individual modes of lathe operations can be combined to form a grouping of synchronous modes for the lathe in FIG. 1(a) or FIG. 1(b), which represent possible joined, or synchronous, operations for the main spindle and sub-spindle. For the non-limiting example of the lathes illustrated in FIG. 1(a) and FIG. 1(b), the possible synchronous modes are identified in Table 3.

TABLE 3

Lathe Synchronous Modes

| Sub-spindle modes | Main Spindle Modes | | |
|---|---|---|---|
| | M0 | M1 | M2 |
| S0 | | M1S0 | M2S0 |
| SF | | M1SF | M2SF |
| SN | | M1SN | M2SN |
| S1 | M0S1 | M1S1 | M2S1 |
| SD | | M1SD | M2SD |

Modes M0S0, M0SF, M0SN and M0SD are not identified in the above table since they are not valid lathe synchronous modes. Mode M0SN can be used with some lathes to designate non-follow support by the sub-spindle for stock being moved along the Z1-axis by the main spindle. However, since there is no cutting of stock occurring in this mode, it is not regarded as a synchronous mode in the present invention. As set forth in Table 1, mode M0 represents an idle main spindle, and the only possible joined cutting operation for the main spindle and sub-spindle with an idle main spindle is synchronous mode M0S1 as further described below.

Figure 2A:
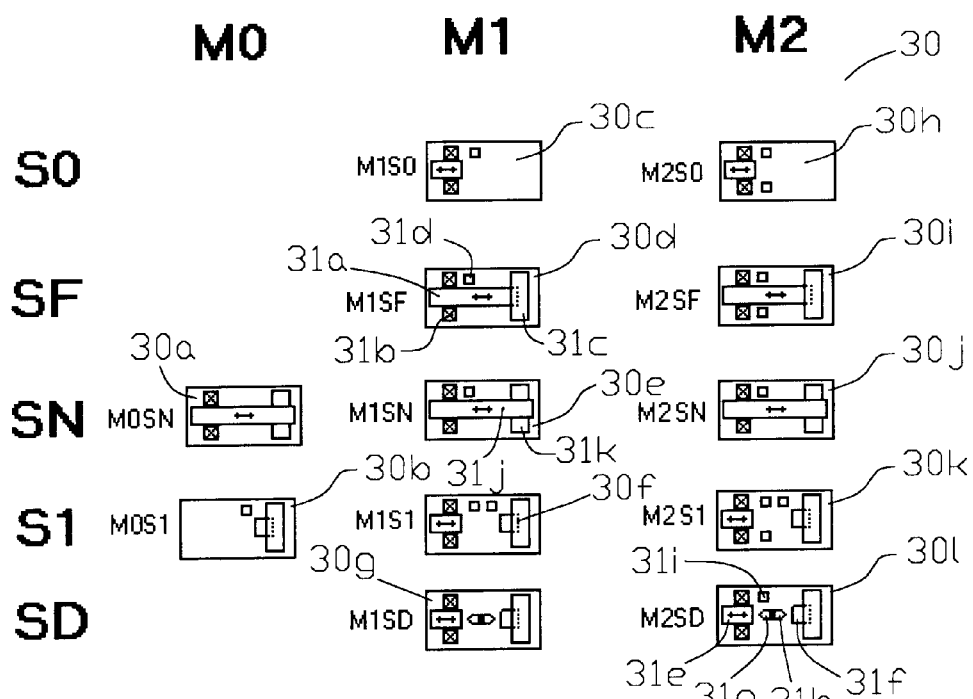
FIG. 2(*a*) is one example of graphic icons that can be associated with a grouping of synchronous modes of lathe operations for a multi-axis lathe.
Figure 2B:
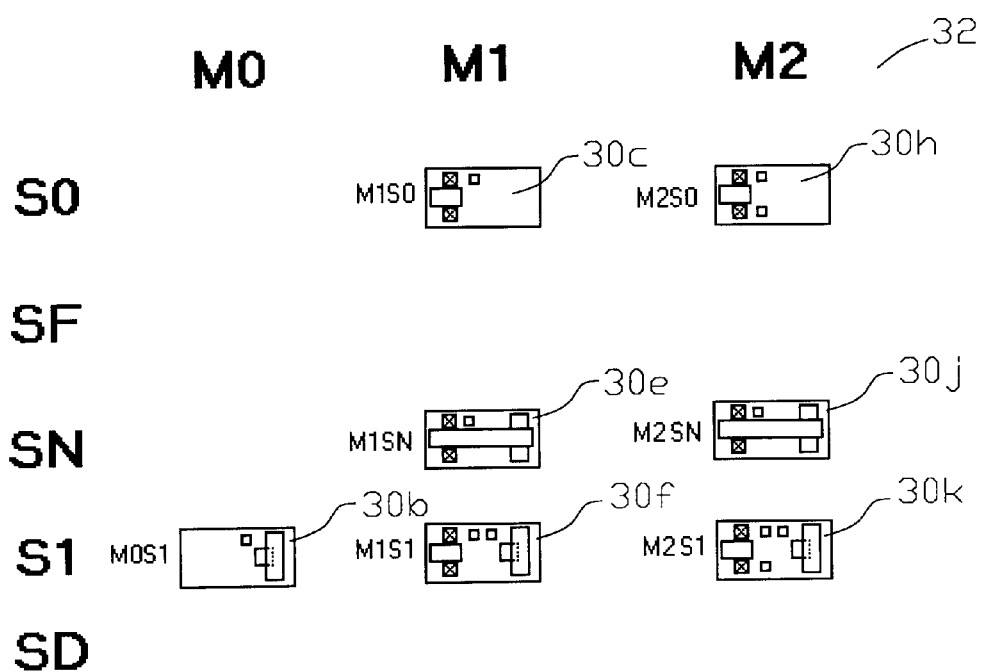

A universal visual graphic icon can be associated with each of the lathe synchronous modes in Table 3 as illustrated in one non-limiting example shown FIG. 2(a) and FIG.2(b). As mentioned above, although icon 30a is shown for mode M0SN in FIG. 2(a), it is not considered to be a synchronous mode in the present invention. The graphic representation for each icon can be, but is not limited to, graphic elements that visually suggest the lathe operation represented by the synchronous mode. For example, lathe synchronous mode M1SF icon 30d in FIG. 2(a) graphically represents an operation wherein first workpiece 102 (graphic element 31a) is held in the main spindle 104 (graphic element 31b) with follow support provided by sub-spindle 120 (graphic element 31c), and cutting of the first workpiece is done with a single tool (graphic element 31d). The double headed arrow graphic within graphic element 31a is one method of visually indicating that first workpiece 102 is moving in the direction of the Z1-axis (sliding stock) during mode M1SF, or in any other mode where the double headed arrow graphic is used. As another example, lathe synchronous mode M2SD icon 301 in FIG. 2(a) graphically represents an operation wherein first workpiece 102 (graphic element 31e) is held in the main spindle and second workpiece 122 (graphic element 31f) is held in the sub-spindle. The front end and back end of the first and second workpieces, respectively, are simultaneously drilled by a double-ended drill (graphic elements 31g and 31h) mounted on a single tool post while the first workpiece is also cut by another tool (graphic element 31i) mounted on a second tool post. Lathe synchronous modes are further described below. Also, as further described below, the lathe synchronous modes and representative icons can be universal since a lathe-specific post-processor can recognize the program code for each lathe synchronous mode of the CAM system and process them for use with a specific lathe.

The icons can be assembled or used in a GUI, for example, in palette windows, similar to window 30 illustrated in FIG. 2(a), and window 32 illustrated in FIG. 2(b), for visual display to a user of the CAM system of the present invention. Since the lathes illustrated in FIG. 1(a) and FIG. 1(b) are only two examples of a multi-axis lathe, for other multi-axis lathes with, for example, different configurations of tool posts, the number of unique synchronous mode icons will change, but the method of grouping the resulting icons is contemplated to be within the scope of the present invention. The icons in FIG. 2(b) illustrate synchronous modes in which the stock in the main spindle is not moving (non-sliding stock). This is indicated by the absence of the double headed arrow graphic within the graphic elements representing stock in the main spindle. Other methods may be used to designate whether the stock is sliding or non-sliding in a particular synchronous mode. For example, M1S0 could be further designated M1S0+ for sliding stock, and M1S0− for non-sliding stock.

A visual display of all lathe operations that must be performed to fabricate at least one part from one or more workpieces can be assembled in a GUI by the CAM system, for example, in a process table similar to process table 40a illustrated in FIG. 3(a). The CAM system can generate an optimized job plan that can be displayed in the process table. A process table can include graphic and alphanumerical data on tools and spindles to be used for each lathe operation that is generated by the CAM program. Process table 40a utilizes a line listing for each lathe operation, or process, that includes, among other parameters: a process number (Proc No.) for the operation; a tool identification number (Tool ID) for each tool used in the operation; the name of the tool (Tool Name) used in the operation; and the process task (Proc Task) to be performed. The particular layout of the process table and inclusion of parameters therein for each lathe operation will vary depending upon a specific application. Each lathe operation is associated with a synchronous mode icon, such as icon 41 in FIG. 3, which is synchronous mode M1S0 as associated with Proc No. 7 milling operation on a first workpiece in the main spindle. Initial assignment of synchronous modes for each lathe operation by the CAM system assumes no synchronization between main and sub-spindle operations by assigning the pseudo-synchronous mode M1S0 or M0S1 to all operations displayed in the process table.

Figure 4:
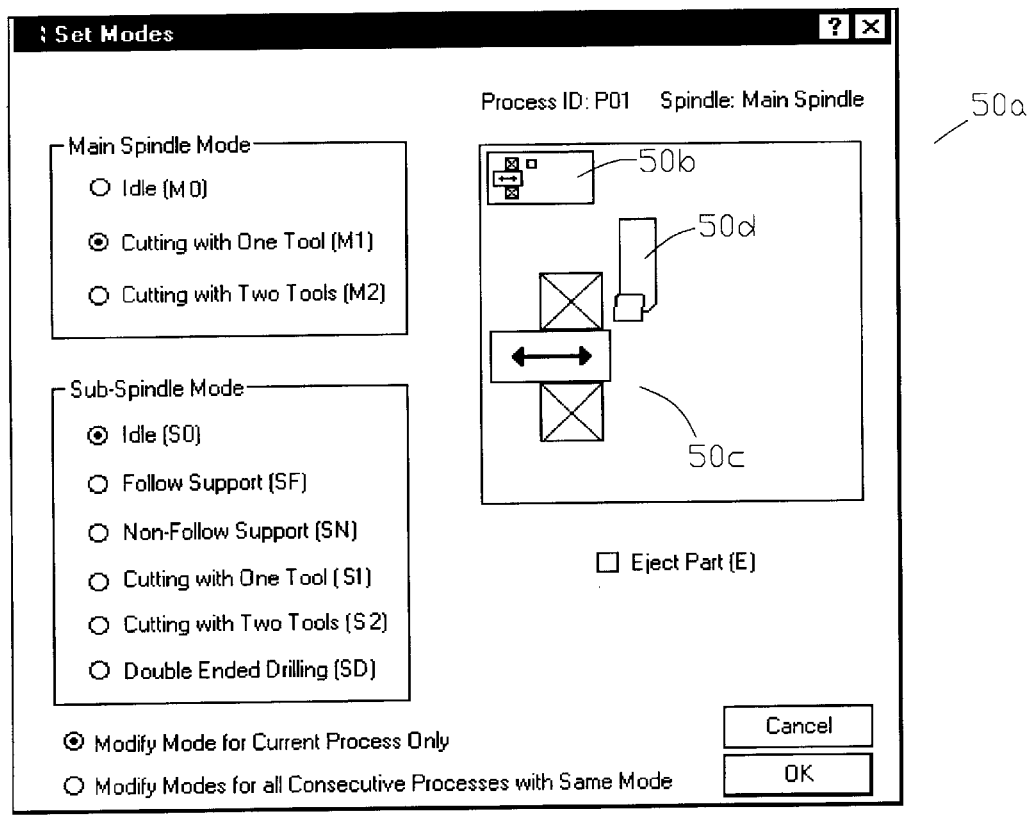
FIG. 4 illustrates a typical set modes dialog window that is set for synchronous mode M1S0.
Figure 9:
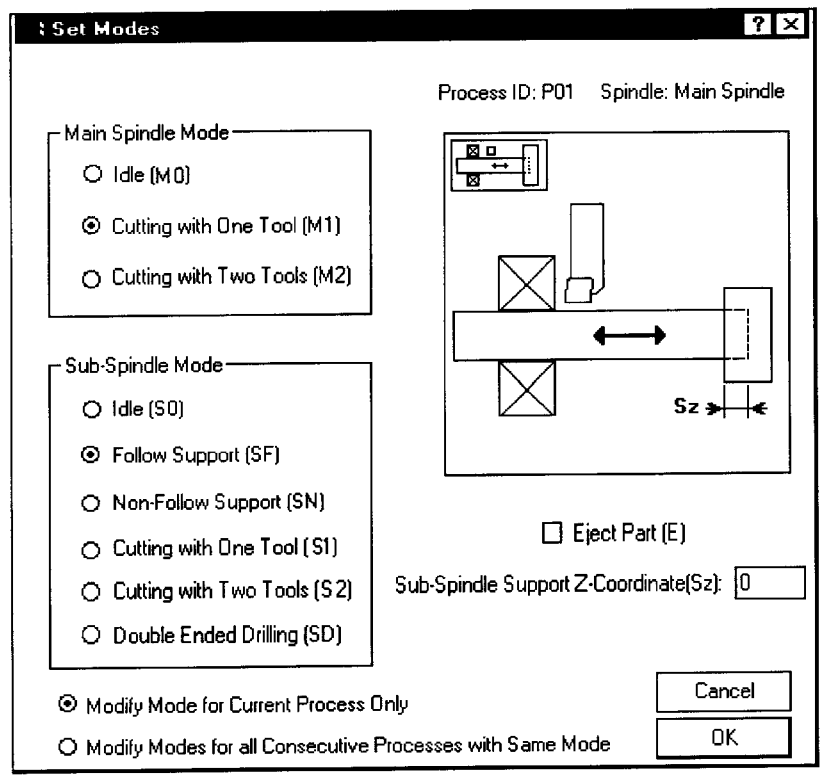
FIG. 9 illustrates a typical set modes dialog windows that is set for synchronous mode M1SF.

Further each synchronous mode icon for a lathe operation can be associated with a GUI set modes dialogue window similar to the set modes dialog window 50*a* illustrated in FIG. 4. As further described below, the modes in set modes dialog window 50*a* are set for synchronous mode M1S0 mode. The set mode dialog window associated with a synchronous mode icon in the process table can be accessed by any suitable selection method, such as a mouse click on its associated synchronous mode icon in the GUI for process table 40*a*. For example clicking on icon 42 in the GUI representation of the process table in FIG. 3(*a*) will result in the visual display of the set modes dialog window in FIG. 4. A set modes dialog window allows the user of the CAM system to change the synchronous mode for a particular machine process. Further the set modes dialog window can be used to set other local and global options associated with a particular synchronous mode, such as whether the stock will be ejected after the lathe operation is performed (check box labeled "Eject Part (E)"), as illustrated in FIG. 4, or the length of stock inserted into the collet or chuck of a sub-spindle when the sub-spindle is providing support of the stock (data entry box labeled "Sub-Spindle Support Z-Coordinate (Sz):", as illustrated in FIG. 9. A synchronous mode icon associated with a lathe operation or process in the process table gives the user an advantage in understanding the type of synchronization being performed. Further a synchronous mode icon 50*b*, along with an enlarged and expanded synchronous mode picture 50*c*, may also be included in the set mode dialog window as shown in the set mode dialog window in FIG. 4 to further facilitate the user's understanding of synchronous operations and shorten the time required to produce a CNC program for fabricating a part. For example in mode picture 50*c*, tool 50*d* is graphically displayed more clearly than the equivalent square graphic element in mode icon 50*b*.

Once the user of the CAM system has finished designating synchronous modes for each lathe process, the CAM system can create one or more synchronization groups (Sync Group). A Sync Group comprises a grouping of two or more lathe processes with the same synchronous mode (except for Type 1 pseudo-synchronous operations). The user may request the creation of Sync Groups and visual display of the groupings in the process table by executing an appropriate computer input command. For example, the user may use a computer input device, such as a mouse, to click on the Sync Group button 42 illustrated in process table 40*b* in FIG. 3(*b*). The CAM system will verify that the user's designated synchronous modes are valid and visually display a Sync Code unique identifier for each Sync Group that is generated by the CAM system. The identifier can be any visual method of distinguishing between synchronization groups, which for process table 40*a* in FIG. 3(*a*) are Sync Group numbers under the column labeled Sync Code. Alternatively the CAM system may automatically generate Sync Groups when the CAM system generates a CNC program from the list of processes to be performed. When the CAM system generates Sync Groups it can perform lathe operational error checking to ensure that the groupings of lathe processes are correctly ordered. Further the error checking can include an evaluation as to whether proper tool pool assignments (relative to the particular lathe configuration) have been made.

Figure 3B:
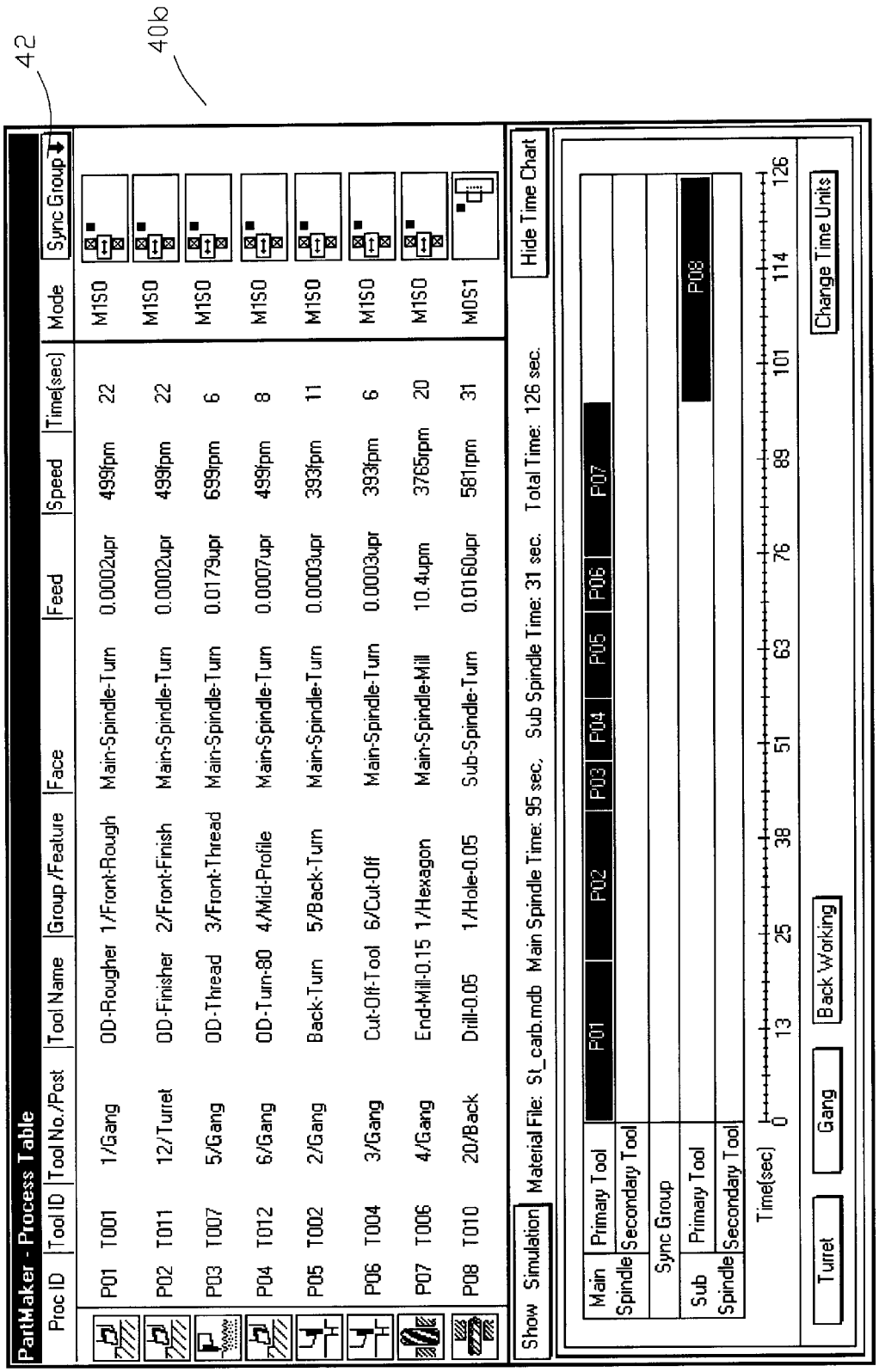
FIG. 3(*a*) is one example of a process table with a synchronous mode graphic icon associated with each lathe operation in the table.
Figure 3C:
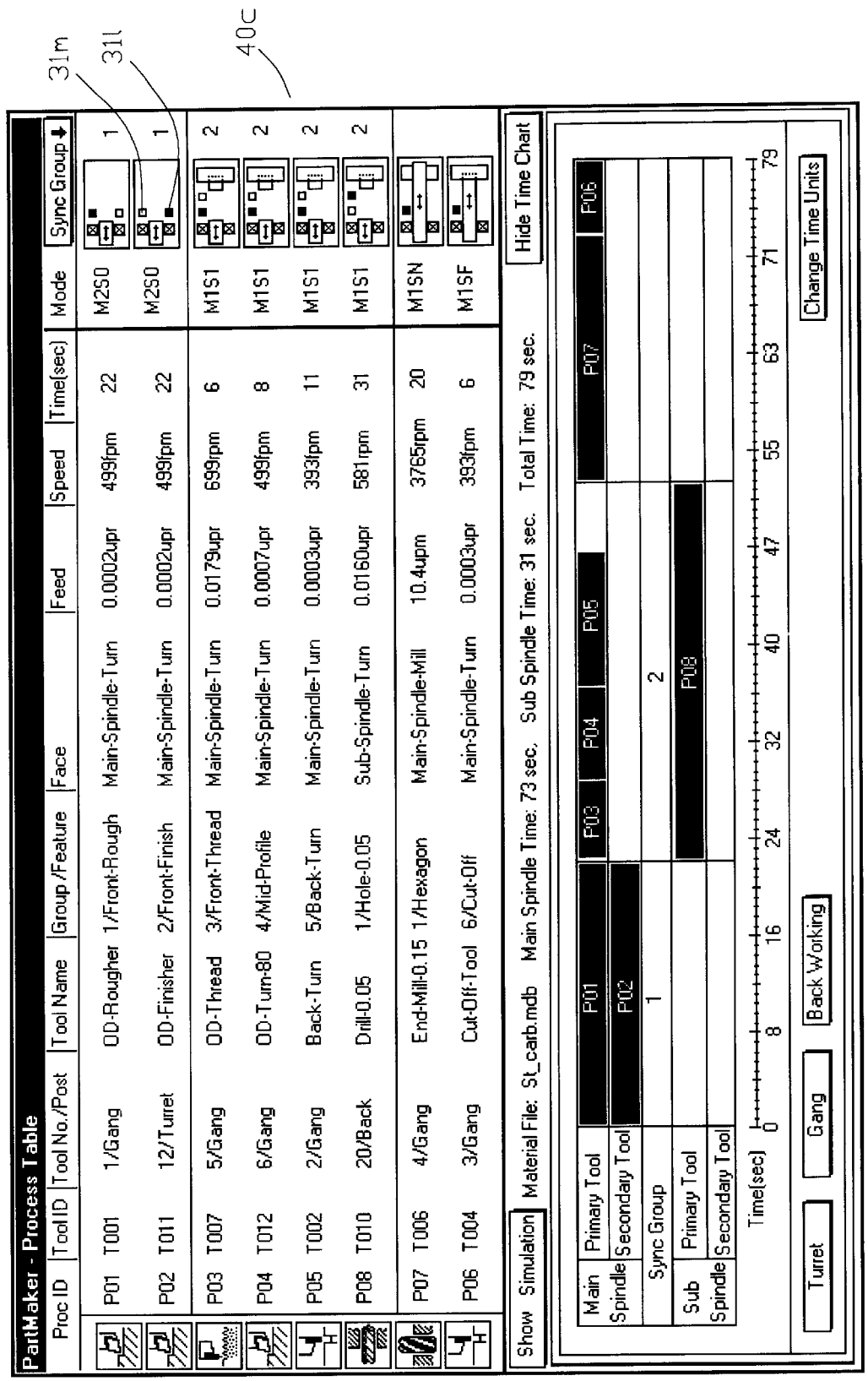
Figure 3D:
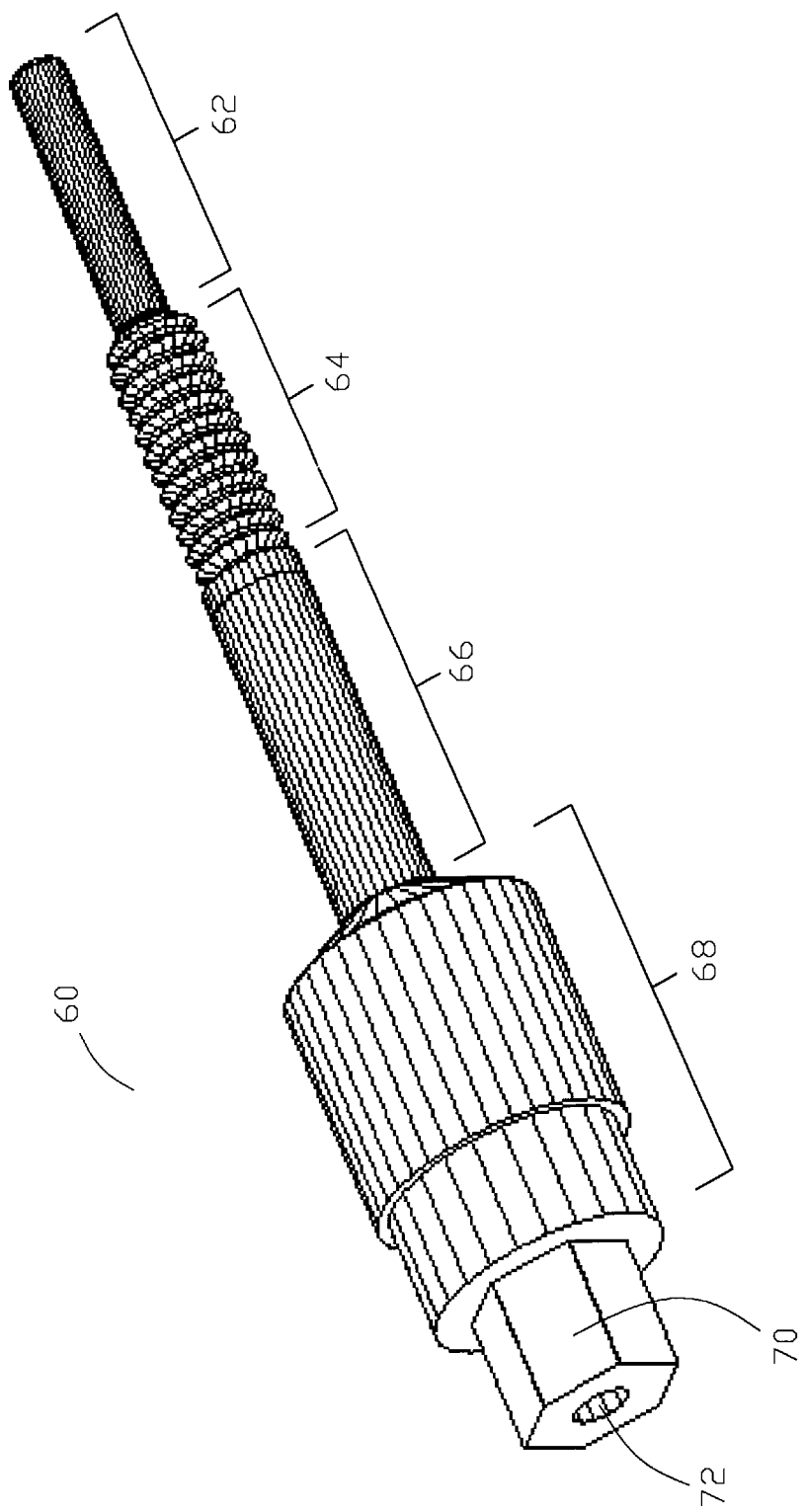

A typical display of a process table 40*a* with Sync Groups assigned is illustrated in FIG. 3(*a*). Sync Group 1 consists of the group of lathe processes identified as process number (Proc No.) 1 and Proc No. 2. Sync Group 2 consists of the group of lathe processes identified as Proc No. 3, 4 and 5. Sync Group 3 consists of the group of lathe processes identified as Proc No. 10 and 11. Sync Group 4 consists of the group of lathe processes identified as Proc No. 12 and 6. Proc No. 7, 8 and 9 are not assigned to a synchronous group since they are all pseudo-synchronous mode Type 1 lathe operations.

The user of the CAM system may input further changes to a synchronous mode for one or more individual lathe processes via the set modes dialog windows after the CAM system creates Sync Groups to evaluate the effects of further altering synchronous lathe processes. Ideally the goal is to balance the cycle time of all lathe processes performed on the main and sub-spindles to fabricate parts. As illustrated at the bottom of process table 40*a* in FIG. 3(*a*), for the synchronous groups created in the table, total main spindle lathe processing time is 2.90 minutes and total sub-spindle lathe processing time is 1.25 minutes. Further modification of a synchronous mode for one or more individual lathe processes can influence the total main and sub-spindle processing times and actual real time sequential execution of the lathe processes.

Once an acceptable arrangement of Sync Groups has been obtained, the user of the CAM system can input an appropriate input command to have the CAM system's postprocessor automatically convert the lathe processes, as visually indicated and synchronized in the process table, into CNC G-code for execution by a lathe specific CNC controller to fabricate at least one part from stock. Lathe operations making up a Sync Group are processed to achieve synchronous execution of the operations by the specific CNC controller.

As another example, process table 40*b* in FIG. 3(*b*) illustrates a listing of lathe operations as initially created by the user of the CAM system. These operation can be performed by a multi-axis CNC lathe to fabricate part 60 illustrated in FIG. 3(*d*). Proc ID P01 and Proc ID P02 perform a roughing and finishing operation, respectively, on front section 62 of the part. Proc ID P03 performs a threading operation of section 64 of the part. Proc ID P04 and Proc ID P05 perform turning operations on the midsection 66 and back section 68, respectively, of the part. Proc ID P07 performs a milling operation to produce hex section 70. Proc ID P08 performs a drilling operation to produce a deep hole 72 on the back end of the part. Finally Proc ID P06 is a cut-off process for separating the finished part from the bar stock. As illustrated in process table 40*b*, all lathe processes or operations are initially assigned, by default, one of the two pseudo-synchronous modes, M1S0 or M0S1. As indicated at the bottom of process table 40*b*, for the listed operations, main spindle execution time is 95 seconds and sub-spindle execution time is 31 seconds. For these unsynchronized operations, total lathe execution time is the sum of the main spindle and sub-spindle execution times, which is 126 seconds. The Time Chart below the process table illustrates in bar graph form how each lathe operation utilizes execution time.

Using the method of the present invention, the user of the CAM system can change the synchronous mode for each operation by displaying the set modes dialog window for each operation and changing the mode as further described above. Process table 40*c* in FIG. 3(*c*) illustrates that the user has changed the synchronous modes as follows: Proc ID P01 and Proc ID P02 to M2S0; Proc ID P03, Proc ID P04, Proc ID P05, and Proc ID P08 to M1S1; Proc ID P07 to M1SN; and Proc ID P06 to M1SF. Further process table 40*c* in FIG. 3(*c*) illustrates that the user has requested the CAM system to assign synchronization groups, which were assigned as Sync Group 1 for Proc ID P01 and Proc ID P02, and Sync Group 2 for Proc ID P03, Proc ID P04, Proc ID P05, Proc ID P08.

As indicated at the bottom of process table 40c, for the listed synchronized operations: main spindle execution time is 73 seconds; sub-spindle execution time is 31 seconds; and total synchronized lathe execution time is 79 seconds. Comparing the Time Charts below process table 40b and process table 40c, it is evident that the synchronized operations are more efficient use of lathe operating time. Further the visual system of synchronization of the present invention has enabled the user of the CAM system to arrive at an optimized synchronized group of lathe operations much quicker than if he or she had to apply a written list of rules to achieve synchronization.

After the creation of the appropriate synchronous modes, and optionally synchronization groups, the postprocessor of the CAM system will generate CNC program code (G-code) to execute the specified synchronous operations on a specific lathe. For example, FIG. 19 illustrates one type of machine-specific G-code fragments that the postprocessor will prepare for lathe operations Proc ID P01 and Proc ID P02 that comprise Sync Group 1 in process table 40c of FIG. 3(c). Synchronization is achieved via G-codes, such as G720 in FIG. 19, which are commonly known as machining patterns. FIG. 20 illustrates G-code fragments generated by the postprocessor for a different type of lathe for the same synchronization group of operations. Synchronization is achieved via 3-digit wait codes, such as M404 in FIG. 20, which are commonly known as wait codes or synchronization codes. The benefit of the synchronous modes of the present invention is that the user of the CAM system does not have to concern himself or herself with creating program code for synchronous lathe operations, such as the code fragments illustrated in FIG. 19 and FIG. 20 for mode M2S0 primary and secondary main spindle processes.

Visual display of icons, tables, set mode dialogue windows, and the like, that are disclosed herein are typically, but not by way of limitation, displayed on a video display operating as a peripheral device associated with a computer system or network, either as a standalone system or integrated with the lathe. Further the CAM system may be implemented using hardware, software, or any combination of hardware and software.

A multi-axis CNC lathe of the present example in FIG. 1(a) and FIG. 1(b) can generally allow four types of synchronous machining operations. The first type (Type 1) of synchronous machining that can be performed on a multi-axis CNC lathe is not a strictly synchronous machining since one of the two spindles is idle while machining is done on the other spindle. Hence the term "pseudo-synchronous" may be applied, in particular, to modes M1S0 and M0S1. Type 1 operations are represented in one example of the present invention by lathe synchronous modes M1S0, M0S1, M1SF and M1SN.

In mode M1S0, one tool is working on stock (or workpiece) in the main spindle while the sub-spindle is idle. The tool may be from any tool post capable of working stock on the main spindle. This mode involves cutting (i.e., applying any tool to the workpiece to "cut" into it) the workpiece on the main spindle with only one tool while no machining occurs on a workpiece that may be in the sub-spindle. The stock may either be stationary or moving (along the Z1-axis) for mode M1S0. M1S0mode of operation may be used if: (1) the operation requires only main spindle work; (2) all simultaneously occurring main and sub-spindle operations have already been synchronized; or (3) the lathe does not allow synchronous operation under certain circumstances, for example, when end working of the stock is being performed or when live tools are engaged. M1S0 mode of operation is represented by icon 30c in FIG. 2(a). Mode M1S0may be assigned to a lathe process in a typical set modes dialogue window 50a illustrated in FIG. 4 by selecting (in this example, with a mouse or other computer input device) the radio button for "Cutting with One Tool (M1)" under "Main Spindle Mode" and "Idle (S0)" under "Sub-Spindle Mode". FIG. 3(b) illustrates a visual display of seven exemplary mode M1S0 synchronous lathe operations in process table 40b for Proc ID P01 through Proc ID P06 turning operations, and Proc ID P07 milling operation.

Figure 5:
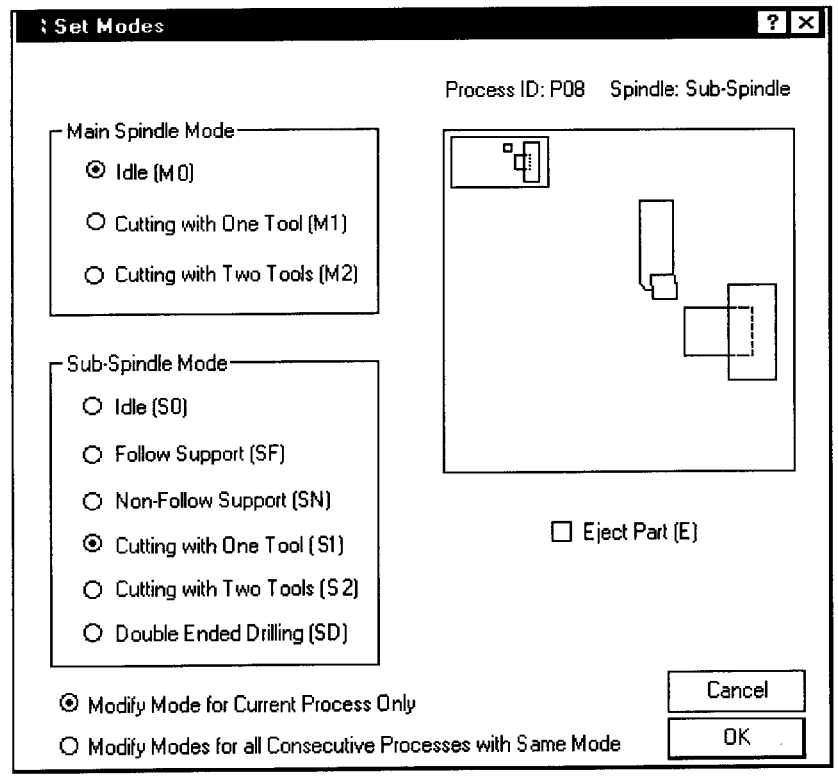
FIG. 5 illustrates a typical set modes dialog window that is set for synchronous mode M0S1.

In mode M0S1, one tool is working on stock in the sub-spindle while the main spindle is idle. The tool may be from any tool post capable of working stock on the sub-spindle. This mode involves cutting the workpiece on the sub-spindle with only one tool while no machining occurs on a workpiece that may be in the main spindle. This mode of operation is represented by icon 30b in FIG. 2(a). Mode M0S1 may be assigned to a lathe process in a typical set modes dialogue window 50b illustrated in FIG. 5 by selecting "Idle (M0)" under "Main Spindle Mode" and "Cutting with One Tool (S1)" under "Sub-Spindle Mode". FIG. 3(a) illustrates a visual display of two exemplary mode M0S1 synchronous lathe operations in process table 40a for Proc ID 8 and Proc ID 9 turning operations.

In mode M1SF, one tool is working stock in the main spindle while the sub-spindle provides follow support of the stock in the main spindle. Since the sub-spindle provides follow support of stock in the main spindle, the utilized tool should have movements independent of the sub-spindle. For follow support, the sub-spindle engages the front end of the stock in the main spindle and travels with it as the stock moves along the Z1-axis during the lathe operation. The term "closed collet" is sometimes associated with this mode since the collet or chuck of the sub-spindle locks around the stock to travel with it during the operation. This mode of operation is represented by icon 30d in FIG. 2(a). The right end termination of graphic element 31a (dotted lines), which represents the first workpiece, in sub-spindle graphic element 31c is one method of visually illustrating that the sub-spindle is holding and following the first workpiece during the operation. Mode M1SF may be assigned to a lathe process in a typical set modes dialogue window 50f illustrated in FIG. 9 by selecting "Cutting with One Tool (M1)" under "Main Spindle Mode" and "Follow Support (FS)" under "Sub-Spindle Mode". Process table 40c in FIG. 3(c) illustrates a visual display for a mode M1SF Sync Group comprising Proc ID P06 cut-off of stock in the main spindle. Since the sub-spindle provides follow support, this operation may be followed by ejection of the cut-off part from the sub-spindle, or further machining of the cut-off part on the sub-spindle.

Figure 11:
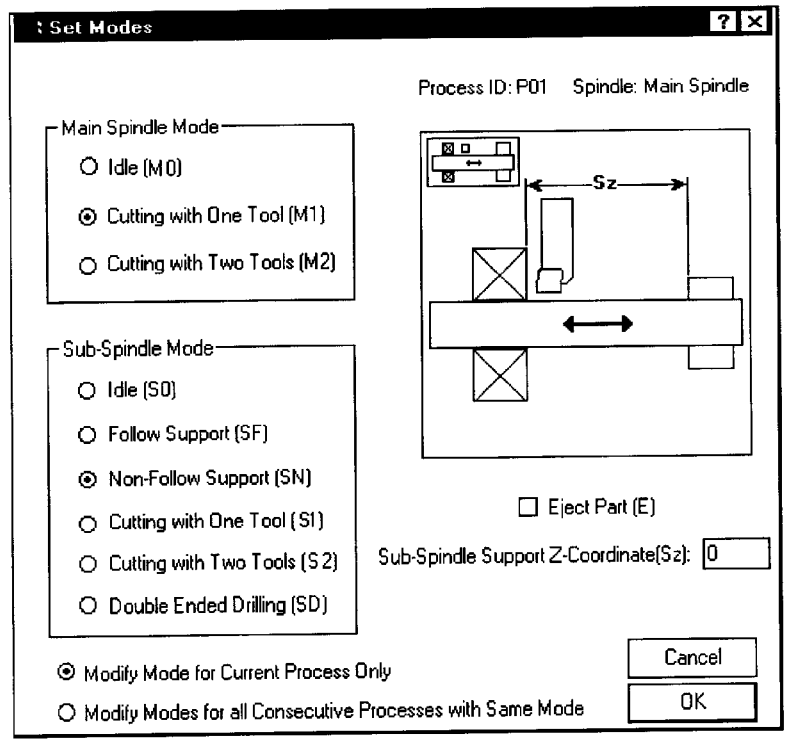
FIG. 11 illustrates a typical set modes dialog windows that is set for synchronous modes M1SN.

In mode M1SN, one tool is working stock in the main spindle while the sub-spindle provides non-follow support of the stock in the main spindle. The stock may either be stationary or moving for mode M1SN. Since the sub-spindle provides non-follow support of stock in the main spindle, the utilized tool should have movements independent of the sub-spindle. For non-follow support, the sub-spindle freely supports the stock in the main spindle and does not travel with it as the stock moves along the Z1-axis during the lathe operation. In this mode, the sub-spindle acts in a manner similar to a guide bushing. The term "open collet" is sometimes associated with this mode since the collet of the sub-spindle is unlocked around the stock to allow the stock to slide through the sub-spindle during the operation. This mode of operation is represented by icon 30e in FIG. 2(a). The passage of graphic element 31j, which represents the first workpiece, through sub-spindle graphic element 31k is one method of visually illustrating that the sub-spindle provides non-follow support. Mode M1SN may be assigned to a lathe process in typical set modes dialogue window 50h illustrated in FIG. 11 by selecting "Cutting with One Tool (M1)" under "Main Spindle Mode" and "Non-Follow Support (FS)" under "Sub-Spindle Mode". Process table 40c in FIG. 3(c) illustrates a visual display for a mode M1SN Sync Group comprising Proc ID P07 end milling process of stock on the main spindle.

The second type (Type 2) of synchronous machining that can be performed on a multi-axis CNC lathe is using two tools simultaneously, with a first tool working stock in the main spindle, and a second tool working stock in the sub-spindle. Type 2 operations are represented in one example of the present invention by lathe synchronous modes M1S1 and M1SD.

Figure 6:
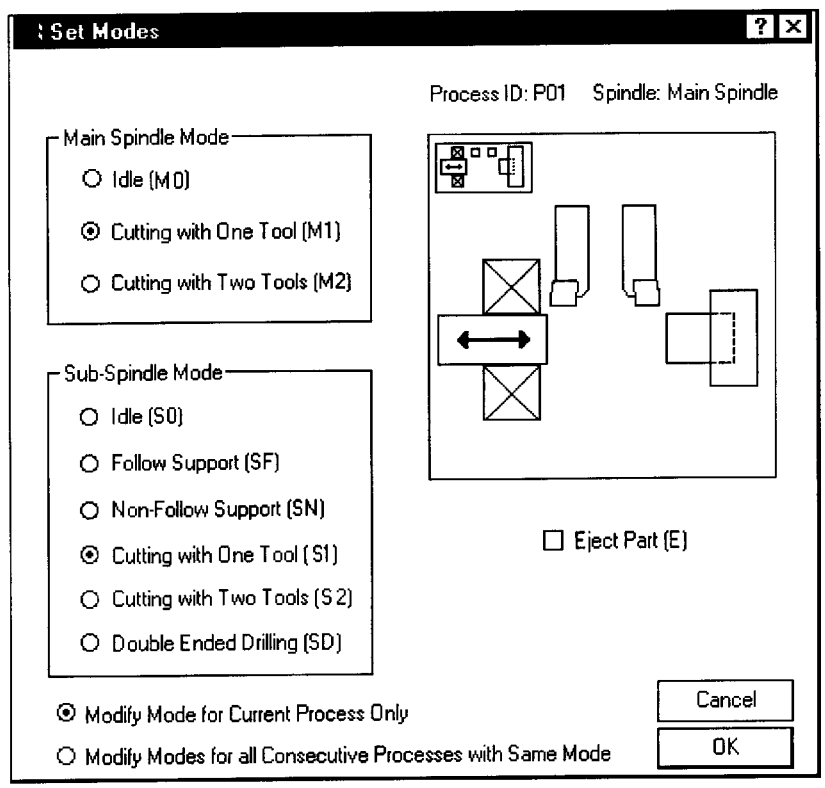
FIG. 6 illustrates a typical set modes dialog window that is set for synchronous mode

In mode M1S1, a first tool is working on stock in the main spindle while a second tool is working on stock in the sub-spindle. This mode involves cutting the workpiece on the main spindle with the first tool, while cutting the workpiece on the sub-spindle with the second tool. The first and second tools are located on different tool posts. The stock on the main spindle may either be stationary or moving for mode M1S1. This mode of operation is represented by icon 30f in FIG. 2(a). Mode M1S1 may be assigned to a lathe process in a typical set modes dialogue window 50c illustrated in FIG. 6 by selecting "Cutting with One Tool (M1)" under "Main Spindle Mode" and "Cutting with One Tool (M1)" under "Sub-Spindle Mode". FIG. 3(c) illustrates a visual display from process table 40c for a mode M1S Sync Group comprising four simultaneous lathe processes, namely Proc ID P03, Proc ID P04, and Proc ID P05 turning operations on the main spindle, and Proc ID P08 turning operation on the sub-spindle, which is designated as Sync Group 2. In one example of the invention, the CAM system will generate a visual error message before it creates CNC code for synchronous mode M1S1 operations if the same tool post is used for both tools working on stock in the main and sub-spindle.

Figure 7:
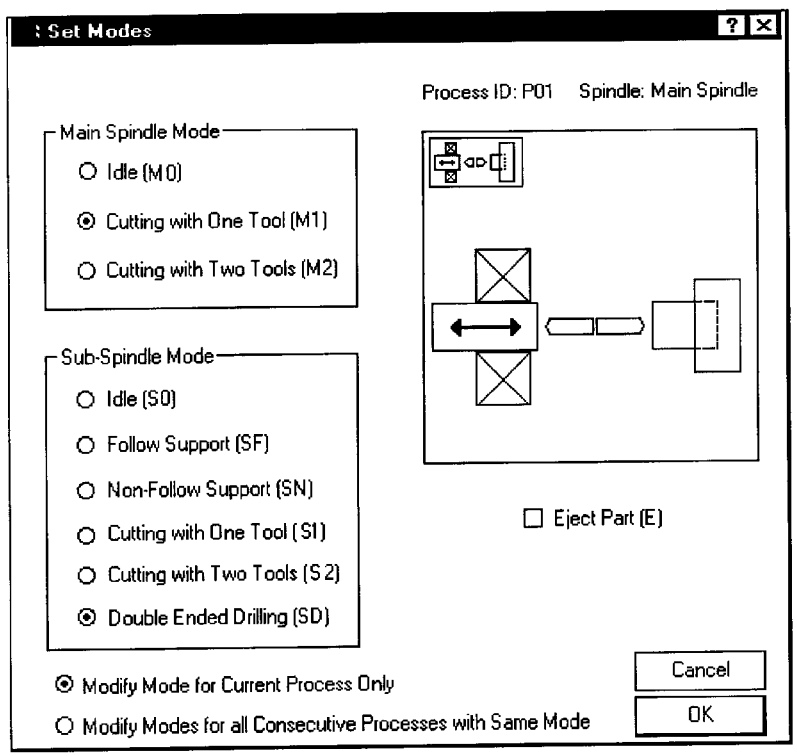
FIG. 7 is illustrates a typical set modes dialog window that is set for synchronous mode M1SD.

In mode M1SD, a first tool and a second tool (on separate first and second tool posts) simultaneously perform on-centerline drilling (drill bit held stationary while the spindle holding the stock rotates) of stock in the main spindle and sub-spindle (one tool working on stock in each of the spindles), respectively. Alternatively, a single double-ended drill tool (on a single tool post) can simultaneously perform end drilling on both the stock in the main spindle and sub-spindle. This mode of operation is represented by icon 30g in FIG. 2(a). Mode M1SD may be assigned to a lathe process in a typical set modes dialogue window 50d illustrated in FIG. 7 by selecting "Cutting with One Tool (M1)" under "Main Spindle Mode" and "Double Ended Drilling (SD)" under "Sub-Spindle Mode". FIG. 15 illustrates a visual display from a typical partial process table 40d for four mode M1SD Sync Groups, each group comprising two simultaneous lathe processes, namely: Sync Group 1, comprising Proc ID P01 spot front end drilling of stock on the main spindle, and Proc ID P12 spot back end drilling of stock on the sub-spindle; Sync Group 2, comprising Proc ID P02 front end drilling of stock on the main spindle, and Proc ID P13 back end drilling of stock on a sub-spindle; Sync Group 3, comprising Proc ID P03 front end drilling of stock on the main spindle, and Proc ID P14 back end drilling of stock on a sub-spindle; and Sync Group 4, comprising Proc ID P04 front end drilling of stock on the main spindle, and Proc ID P15 back end drilling of stock on a sub-spindle.

In Type 3 and Type 4 lathe operations as further described below, at least two tools are simultaneously working stock on the main spindle. For these modes, the CAM system differentiates the two tools as a primary and secondary tool. The primary or first tool is defined as the tool performing the work in the first lathe process in a Sync Group. The primary tool typically dictates lathe operating parameters such as feed rate of stock and spindle speed. The secondary tool operates in synchronization with the primary tool and is represented in another lathe process in the Sync Group. For lathes with a tool post configured as a gang slide, a tool on the gang slide used in a Sync Group process will generally be the primary tool. Visual distinction between a tool in use and not in use during a synchronous mode operation can be accomplished, for example, by using different shading or colors for each class of tools. For example, for the synchronous mode icons in process table 40c in FIG. 3(c), tools used in a synchronous mode are designated with a black square graphic element 31l, and tools not used in a synchronous mode are designated with a white square graphic element 31m.

The third type (Type 3) of synchronous machining that can be performed on a multi-axis CNC lathe is using two tools simultaneously on stock in the main spindle. The tools are assigned primary and secondary designations as further described below. One example of Type 3 synchronous machining is "pinch turning" or "balance turning" wherein two tools are used to perform two outside diameter turning operations. Another example is using a first tool for turning on an outside diameter (OD) of the stock, and a second tool for inside diameter (ID) simultaneous boring of the stock, or simultaneous drilling on the end of the stock. Type 3 operations are represented in an example of the present invention by lathe synchronous modes M2S0, M2SF and M2SN.

Figure 8:
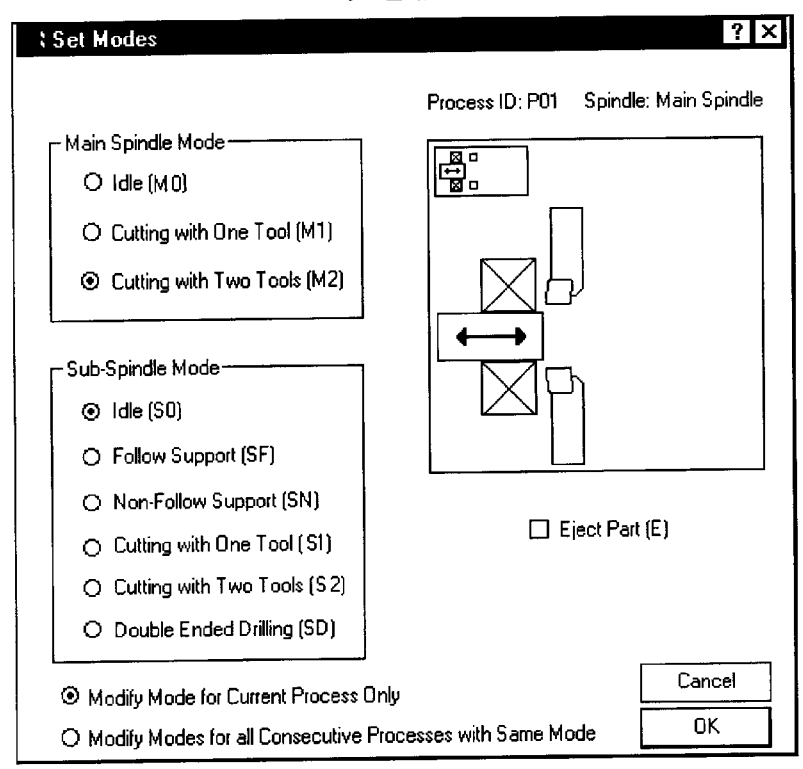
FIG. 8 illustrates a typical set modes dialog window that is set for synchronous mode M2S0.

In mode M2S0, a first and a second tool (from separate tool posts) are working stock simultaneously in the main spindle while the sub-spindle is idle. The tools can either both be turning tools, or one can be a turning tool while the other is a dead (drill bit stationary and workpiece rotating in spindle) hole-making tool performing on-centerline work on the front end of the workpiece in the main spindle. Pinch turning is handled in this mode, which will be designated automatically when the process table is created if pinch turning has been previously selected in the CAM system when part parameters are defined. The stock may either be stationary or moving for mode M2S0. This mode of operation is represented by icon 30h in FIG. 2(a). Mode M2S0 may be assigned to a lathe process in a typical set modes dialogue window 50e illustrated in FIG. 8 by selecting "Cutting with Two Tools (M2)" under "Main Spindle Mode" and "Idle (S0)" under "Sub-Spindle Mode". Process table 40b in FIG. 3(b) illustrates a visual display for a mode M2S0 Sync Group 1, which is a pinch turning operation comprising Proc ID P01 primary tool, and Proc ID P02 secondary tool working on stock on a main spindle.

Figure 10:
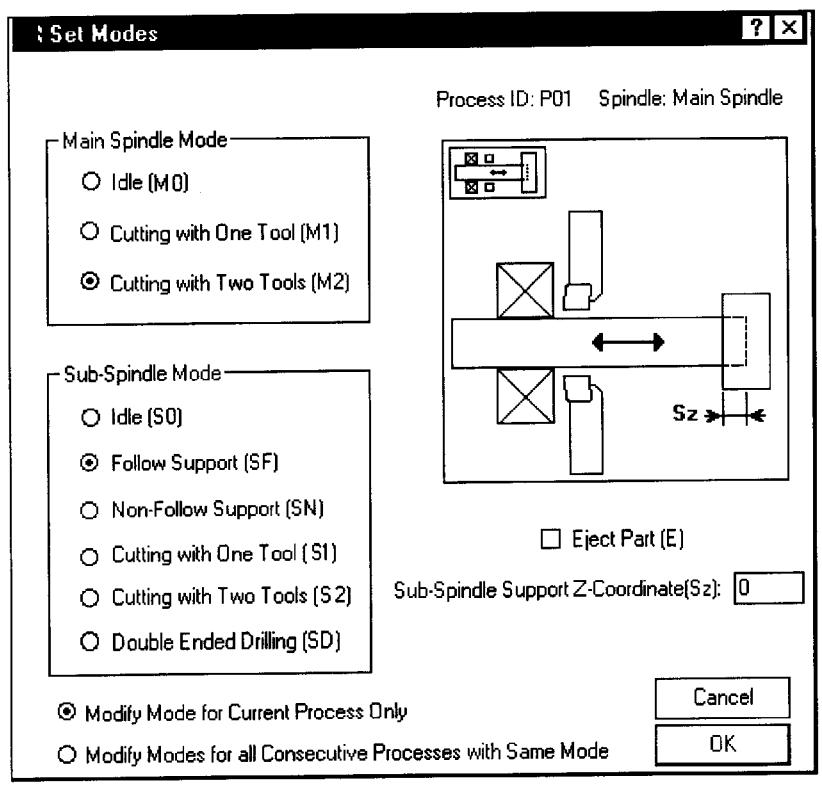
FIG. 10 illustrates a typical set modes dialog windows that is set for synchronous mode M2SF.

In mode M2SF, a first and a second tool (from separate tool posts) are working stock simultaneously in the main spindle while the sub-spindle provides follow support of the stock in the main spindle. This mode of operation is represented by icon 30i in FIG. 2(a). Mode M2SF may be assigned to a lathe process in a typical set modes dialogue window 50g illustrated in FIG. 10 by selecting "Cutting with Two Tools (M2)" under "Main Spindle Mode" and "Follow Support (FS)" under "Sub-Spindle Mode". FIG. 16 illustrates a visual display from a typical partial process table 40e for a mode M2SF Sync Group 1 comprising Proc ID P01 outer diameter turning process of stock on the main spindle and Proc ID P02 outer diameter turning process of stock on the main spindle.

Figure 12:
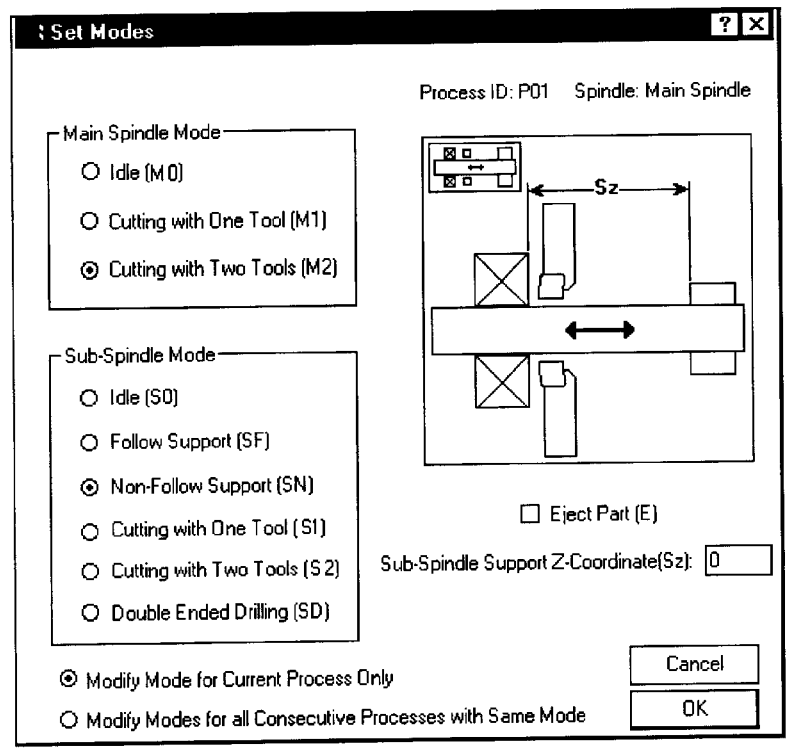
FIG. 12 illustrates a typical set modes dialog windows that is set for synchronous modes M2SN.

In mode M2SN, a first and a second tool (from separate tool posts) are working simultaneously on stock in the main spindle while the sub-spindle provides non-follow support of the stock in the main spindle. In this mode, both tools must both be working the outside diameter of the stock. The stock may either be stationary or moving for mode M2SN. This mode of operation is represented by icon 30j in FIG. 2(*a*). Mode M2SN may be assigned to a lathe process in typical set modes dialogue window 50i illustrated in FIG. 12 by selecting "Cutting with Two Tools (M2)" under "Main Spindle Mode" and "Non-Follow Support (FS)" under "Sub-Spindle Mode". FIG. 16 illustrates a visual display from a typical partial process table 40e for a mode M2SF Sync Group 2 comprising Proc ID P03 outer diameter turning process of stock on the main spindle and Proc ID P04 outer diameter turning process of stock on the main spindle.

The fourth type (Type 4) of synchronous machining that can be performed on a multi-axis CNC lathe is the simultaneous use of three tools, with two tools working on stock in the main spindle, and the third tool working on stock in the sub-spindle. This type of synchronous operation is not available on all multi-axis CNC lathes. On lathes where it is available, Type 4 operations are represented in an example of the present invention by lathe synchronous modes M2S1 and M2SD.

Figure 13:
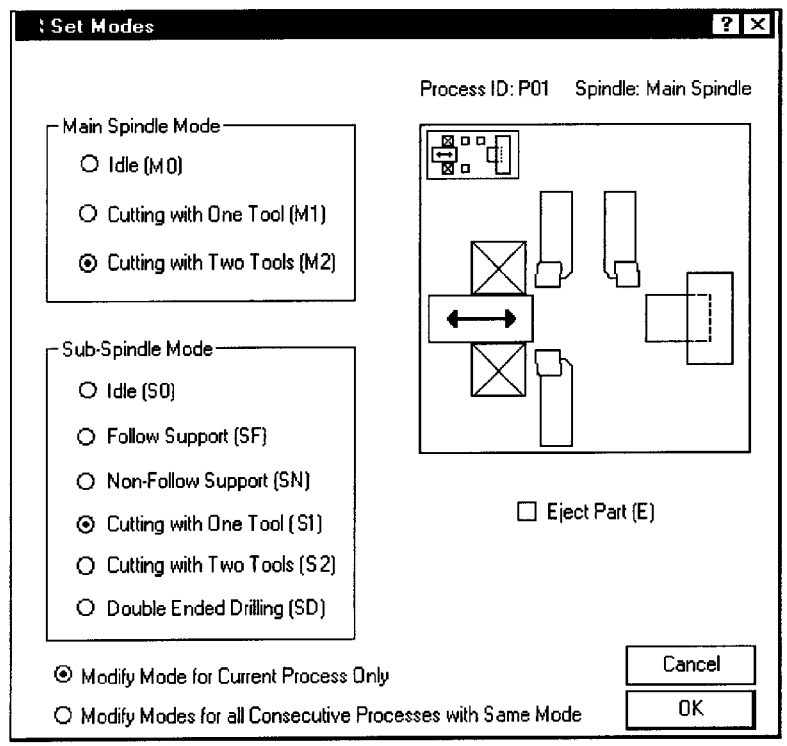
FIG. 13 illustrates a typical set modes dialog window that is set for synchronous mode M2S1.

In mode M2S1, a first tool and a second tool (on separate first and second tool posts) are working stock simultaneously in the main spindle, while a third tool (on a third separate tool post), such as a back end working tool, works on stock in the sub-spindle. The stock in the main spindle may either be stationary or moving for mode M2S1. This mode of operation is represented by icon 30k in FIG. 2(*a*). Mode M2S1 may be assigned to a lathe process in a typical set modes dialogue window 50j illustrated in FIG. 13 by selecting "Cutting with Two Tools (M2)" under "Main Spindle Mode" and "Cutting with One Tool (S1)" under "Sub-Spindle Mode". FIG. 17 illustrates a visual display from a typical partial process table 40f for a mode M2S1 Sync Group 1 comprising two processes for working stock on the main spindle with two different tools (facing Proc ID P01 with primary tool, and Proc ID P02 with secondary tool) and one process (drilling Proc ID P09) for working stock on the sub-spindle with a third tool. Facing Proc ID P01 and Proc ID P02 represent a pinch turning operation. In FIG. 17, the synchronous mode for Proc ID P09 includes a "/E" suffix to displayed mode M2S1/E. The "/E" suffix indicates that the stock in the sub-spindle will be released or ejected from the sub-spindle after completion of the specified drilling operation. The ejection step may be designated for the lathe process by checking the "Eject Part (E)" check box with a suitable computer input device in a set mode dialog window. In one example of the invention, the CAM system will generate a visual error message before it creates CNC code for synchronous mode M2S1 operations if the same tool post is used with either the primary or secondary tool on stock in the main spindle and/or the tool being used on stock in the sub-spindle.

Figure 14:
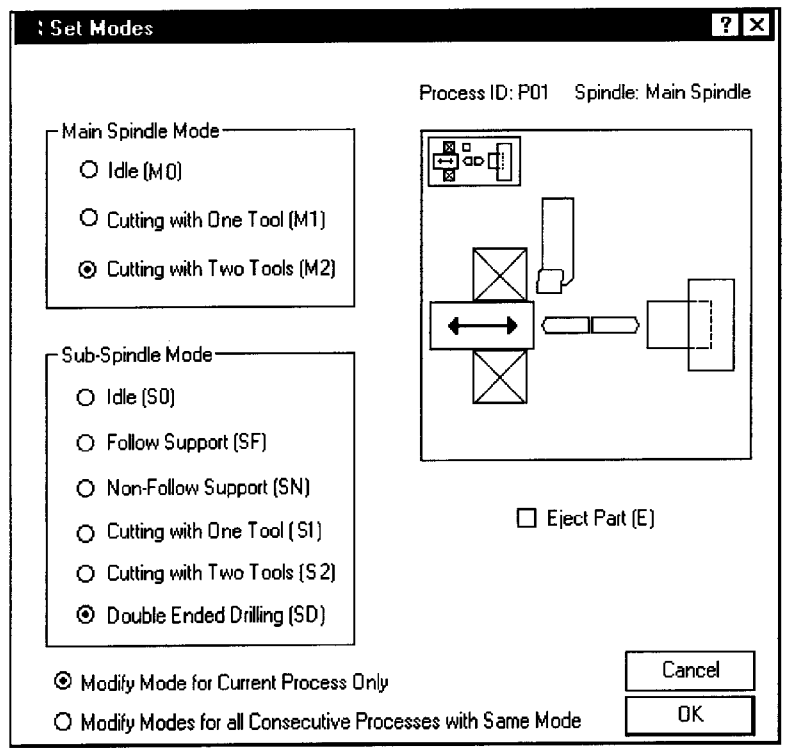
FIG. 14 illustrates a typical set modes dialog window that is set for synchronous mode M2SD.

In mode M2SD, a first tool and a second tool (on separate first and second tool posts) simultaneously perform on-centerline drilling (drill bit held stationary while the spindle holding the part rotates) of stock in the main spindle and sub-spindle (one tool working on stock in each spindle), respectively, while a third tool simultaneously turns the outside diameter of the workpiece on the main spindle. In mode M2SD, the tool turning the outside diameter of the workpiece on the main spindle is designated the primary tool, and the tool performing on-centerline drilling on the same stock is designated the secondary tool. In mode M2SD, the third tool working on stock in the sub-spindle may be mounted on the same tool post as the secondary tool. Further in mode M2SD, stock in the main spindle should be moving for all main spindle processes. Alternatively, a single double-ended drill tool (on a single tool post) simultaneously performs end drilling on both workpieces in the main spindle and sub-spindle, while a third tool (on a third separate tool post) simultaneously turns the outside diameter of the workpiece on the main spindle. This mode of operation is represented by icon 30l in FIG. 2(*a*). Mode M2SD may be assigned to a lathe process in a typical set modes dialogue window 50k illustrated in FIG. 14 by selecting "Cutting with Two Tool (M2)" under "Main Spindle Mode" and "Double Ended Drilling (SD)" under "Sub-Spindle Mode". FIG. 18 illustrates a visual display from a typical partial process table 40g for a mode M2SD Sync Group comprising two processes for working stock on the main spindle with two different tools (turning Proc ID P06 with primary tool, and drilling Proc ID P02 with secondary tool) and one process (drilling Proc ID P13) for working stock on the sub-spindle with a third tool. Drilling Proc ID P02 and drilling Proc ID P13 represent simultaneous on-centerline drilling of stock in the main spindle and sub-spindle, while turning Proc ID 06 represents the simultaneous outside diameter turning process. In one example of the invention, the CAM system will generate a visual error message if the same tool post is used with either the primary or secondary tool on stock in the main spindle, or the third tool being used on stock in the sub-spindle is on the same tool post as that for the primary tool.

In some configurations, a multi-axis CNC lathe will be capable of Type 1 and Type 2 synchronous modes of operation. Type 3 and/or type 4 modes of synchronous modes of operations may be performed on other types of multi-axis lathes. Further more than one sub-spindle may be provided on a lathe, and when multiple tools are used on a workpiece, more than the number of multiple tools described in the above examples may be used on the lathe. When the multi-axis CNC lathe has at least two spindles, the minimum set of synchronous modes is only M1S0.

Figure 2C:
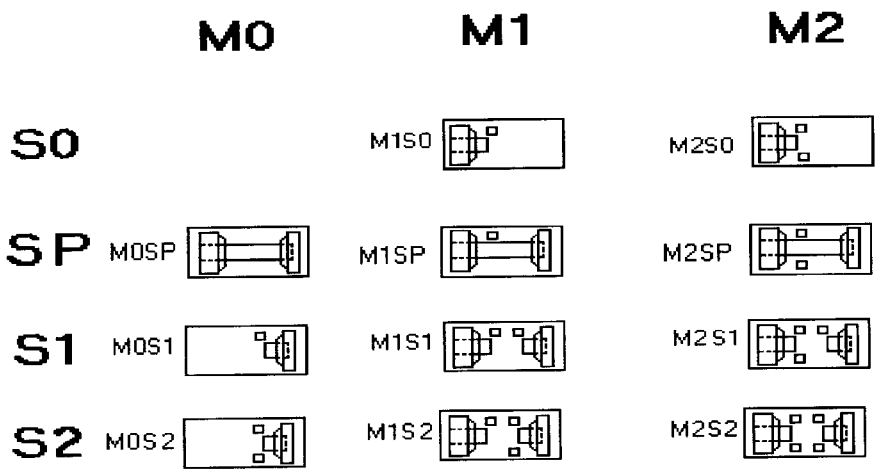

As stated above, with respect to synchronous operation, a turning center and Swiss-type lathe can both be classified as multi-axis CNC lathes for purposes of this invention. A turning center has synchronous modes similar to that for a Swiss-type lathe. FIG. 2(*c*) illustrates a set of universal visual graphic icons for the synchronous modes of one example of a turning center. In this example, turning center modes M0S1, M1S0, M1SP, M1S1, M2S0, M2SP, M2S1 generally correspond to Swiss-type lathe modes M0S1, M1S0, M1SN, M1S1, M2S0, M2SN, M2S1, respectively, with the exception that the workpiece generally remains fixed in the main spindle for cutting operations with a turning center. The stock in the main spindle may be pulled out of the main spindle by the sub-spindle in mode M0SP. However, this mode does not involve any cutting of the stock, so it is not considered a synchronous mode as categorized in the present invention. In the above turning center modes, the "P" in the M1SP and M2SP modes designates part (stock) support for a non-follow stock, whereas the "N" in the corresponding Swiss-lathe modes M1SN and M2SN designates non-follow support. This particular example of a turning center also includes modes: M0S2 (main spindle idle; sub-spindle working stock with two tools); M1S2 (main spindle working stock with one tool; sub-spindle working stock with two tools); M2S2 (main spindle working stock with two tools; sub-spindle working stock with two tools). While the above example of synchronous modes for a Swiss-type lathe does not include modes wherein stock is cut on the sub-spindle with two tools, a Swiss-type multi-axis lathe could be configured in this fashion. The process of two tools working simultaneously on a workpiece in the sub-spindle is generally the same as the corresponding Swiss-type lathe process for two tools working simultaneously on a workpiece in the main spindle, with the exception that workpiece in the sub-spindle is not moving.

The above synchronous mode designations are mode designations for the disclosed non-limiting examples of the invention. Generally the mode designations are of the form: M*S* wherein: "M" designates the first or main spindle; "S" designates the second or sub-spindle; and "*" designates either the number of tools working on the stock in the spindle of the preceding designation, or a letter (e.g., D, F, N or P) corresponding to a special function. The disclosed examples of the invention are for machines with either sliding stock (Swiss-type lathes) or stationary stock (turning centers). Generally a spindle can either hold sliding stock or it can hold stationary stock. Thus the mode designation can further be generalized to, for example, M*^S*^, wherein "^" designates the type of stock with, for example, "+" designating sliding stock and "−" designating stationary stock. The artisan will appreciate that the synchronous mode designations and synchronous grouping of machine operations can be expanded in accordance with the present invention to accommodate additional spindles and/or tool posts. For example, a mode designation scheme of A*, B*, C* wherein each spindle is designated by a letter, and then appropriately lettered spindles are grouped, such as A*–B*– C*–D* to indicate a synchronous mode involving spindles A, B, C and D. As a more specific example, the mode designation A1-B2-C0-DFA could be used to designate a synchronous mode wherein: one tool works on a workpiece in spindle A (A1); two tools work on a workpiece in spindle B (B2); spindle C is idle (C0); and spindle D is providing follow support to a workpiece in spindle A (DFA). If a spindle carries out a special function designated by letters: D (double ended drilling on sliding stock); F (follow support of sliding stock); N (non-follow support of sliding stock); or P (part support for stationary stock) then the "◯" can be replaced by a name of the spindle to which the function applies. For example, |A2+|B1–|C2+|DFA| can designate: 2 tools working on sliding stock in spindle A; 1 tool working on stationary stock in spindle B; 2 tools working on sliding stock in spindle C; and spindle D providing follow support for spindle A.

Figure 1D:
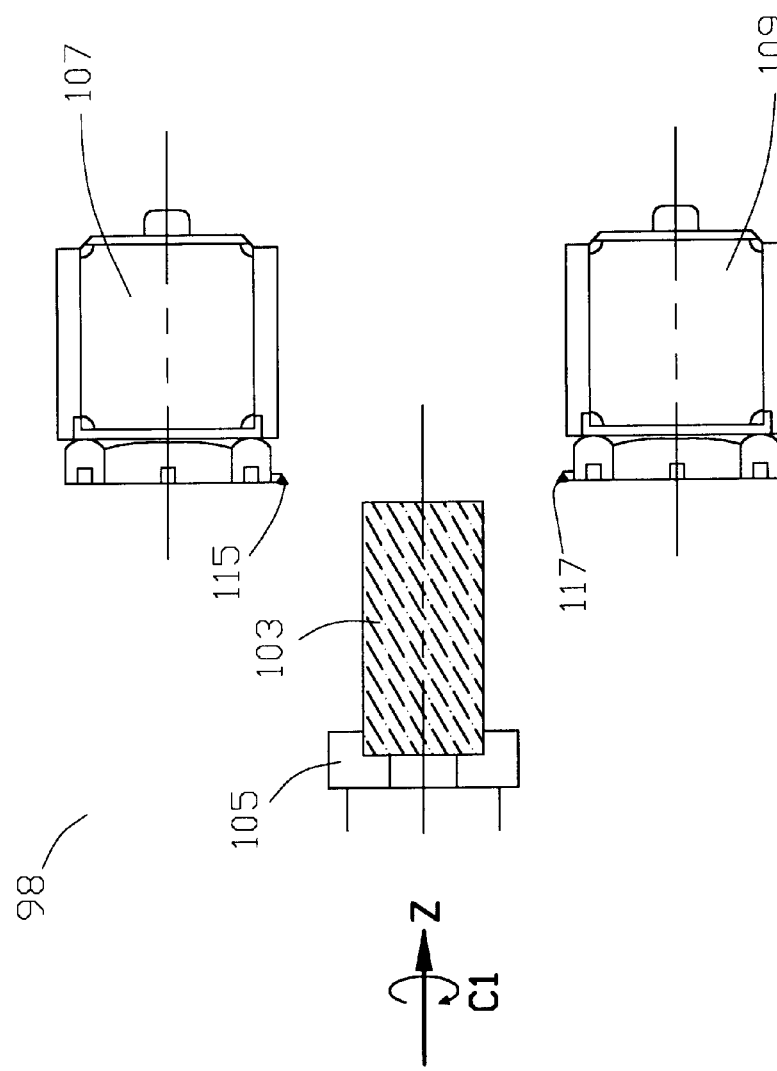
Figure 1D:
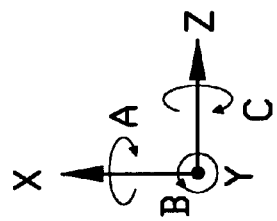

Generally a minimally configured multi-axis CNC lathe to which the visual method of synchronous operation applies, regardless of whether the lathe is further designated as a Swiss-type lathe or turning center, is either a single spindle and a minimum of two tools, with at least one of the two tools working on a workpiece in the single spindle, as illustrated for the lathe in FIG. 1(d), or a minimum of two spindles and one tool working on a workpiece in either the first or second spindle. Generally for the minimally configured lathe with a single spindle and a minimum of two tools, synchronous modes can be defined as iterative synchronous modes M1, M2, M3, M4, M5, and so forth, wherein the first mode, M1, is defined as one of the two minimum tools working on a workpiece in the single spindle; the second mode, M2, is defined as both of the two minimum tool working simultaneously on the workpiece. If a third tool is added to the two minimum tools, then mode M3 is defined as the three tool working simultaneously on the workpiece in the single spindle, and so forth, for each following mode that adds one additional simultaneously working tool. Generally, then, the n-th synchronous mode, where n is the series of integers from 1 to the total number of synchronous modes, comprises n tools working simultaneously on a workpiece in the single spindle. More complex lathe configurations are based upon one of the two above minimally configured multi-axis lathes, and can include additional spindles and/or additional tools working simultaneously on one or more workpieces (and/or providing support for one or more workpieces in other spindles).

The various layouts and depictions of icons, process tables, dialogue windows, and such, are exemplary. Variations in these elements and similar elements are within the scope of the invention. Further use of the terms simultaneous and synchronous operations means that the multiple operations may be performed during a common time period, but not necessarily that all of the operations occur continuously throughout the common time period.

The foregoing specification does not limit the scope of the present invention. The scope of the invention is further set forth in the appended claims.

What is claimed is:

1. A visual system for display of the synchronous operations of a CNC multi-axis lathe for fabricating an at least one part by execution of the synchronous operations, the visual system comprising:
   a visual listing of the synchronous operations in a graphical user interface; and
   a plurality of icons, an each one of the plurality of icons representing a synchronous mode for an each one of the synchronous operations, the plurality of icons selectively associated with the visual listing of the synchronous operations in the graphical user interface.

2. The visual system of claim 1 further comprising a postprocessor to create a computer code for fabricating the at least one part from the synchronous operations as ordered by the synchronous mode for the each one of the synchronous operations in the visual listing.

3. The visual system of claim 1 further comprising a plurality of set mode dialog windows in a graphical user interface, an each one of the plurality of set mode dialog windows selectively associated with the each one of the plurality of icons.

4. The visual system of claim 3 wherein selection of the each one of the plurality of icons visually displays the each one of the plurality of set mode dialog windows selectively associated with the each one of the plurality of icons whereby the synchronous mode can be modified.

5. The visual system of claim 1 further comprising a one or more arranged synchronization groups of the synchronous operations, the one or more arranged synchronization groups visually displayed in the visual listing of the synchronous operations, each of the one or more arranged synchronization groups comprising two or more of the synchronous operations.

6. The visual system of claim 5 further comprising a postprocessor to create a computer code for fabricating the at least one part from the synchronous operations as ordered in the one or more arranged synchronization groups.

7. A visual method of displaying the synchronous operations of a multi-axis lathe in a graphical user interface, the multi-axis lathe having a single spindle and at least two tools controlled by a CNC program, the method comprising the step of forming an iterative plurality of icons representing the modes of synchronous operation wherein the n-th mode of synchronous operation comprises n tools simultaneously working on a workpiece in the single spindle and n is a series of integers ranging from 1 to the total number of the iterative plurality of modes of synchronous operations.

8. A visual method of displaying the synchronous operations of a multi-axis lathe in a graphical user interface, the multi-axis lathe having an at least two spindles and an at least one tool controlled by a CNC program, the method comprising the step of forming a first icon representing a first mode of synchronous operations wherein a first tool of the at least one tool works on a first workpiece in a first spindle of the at least two spindles, and the remainder of the at least two spindles are idle.

9. The method of claim 8 further comprising the step of forming a second icon representing a second mode of synchronous operations wherein the first spindle of the at least two spindles is idle, and a second tool of the at least one tool works on a second workpiece in at least a second spindle of the remainder of the at least two spindles.

10. The method of claim 9 further comprising the step of forming a third icon representing a third mode of synchronous operations wherein the first tool of the at least one tool works on the first workpiece in the first spindle of the at least two spindles, and the second spindle of the remainder of the at least two spindles provides non-follow support of the first workpiece.

11. The method of claim 10 further comprising the step of forming a fourth icon representing a fourth mode of synchronous operations wherein the first tool of the at least one tool works on the first workpiece in the first spindle of the at least two spindles, and second spindle of the remainder of the at least two spindles provides follow support of the first workpiece.

12. The method of claim 9 further comprising the step of forming a fifth icon representing a fifth mode of synchronous operations wherein the first tool of the at least one tool works on the first workpiece in the first spindle of the at least two spindles, and the second tool of the at least one tool works on the second workpiece in the second spindle of the remainder of the at least two spindles.

13. The method of claim 12 further comprising the step of forming a sixth icon representing a sixth mode of synchronous operations wherein the first tool of the at least one tool performs on-centerline drilling on the first workpiece in the first spindle of the at least two spindles, and the second tool of the at least one tool performs on-centerline drilling on the second workpiece in the in the second spindle of the remainder of the at least two spindles.

14. The method of claim 13 wherein the first tool and the second tool comprises a single double-ended drill tool.

15. The method of claim 8 further comprising the step of forming a seventh icon representing a seventh mode of synchronous operations wherein the first tool of the at least one tool and a first secondary tool of the at least one tool work on the first workpiece in the first spindle of the at least two spindles, and the remainder of the at least two spindles are idle.

16. The method of claim 15 further comprising the step of forming an eight icon representing a eighth mode of synchronous operations wherein the first tool of the at least one tool and the first secondary tool of the at least one tool work on the first workpiece in the first spindle of the at least two spindles, and the second spindle of the remainder of the at least two spindles provides non-follow support of the first workpiece.

17. The method of claim 16 further comprising the step of forming a ninth icon representing a ninth mode of synchronous operations wherein the first tool of the at least one tool and the first secondary tool of the at least one tool work on the first workpiece in the first spindle of the at least two spindle, and the second spindle of the remainder of the at least two spindles provides follow support of the first workpiece.

18. The method of claim 15 further comprising the steps of:
    forming a tenth icon representing a tenth mode of synchronous operations wherein the first tool of the at least one tool and the first secondary tool of the at least one tool work on the first workpiece in the first spindle of the at least two spindle, and the second tool of the at least one tool works on the second workpiece in the second spindle of the remainder of the at least two spindles; and
    forming an eleventh icon representing a eleventh mode of synchronous operations wherein the first secondary tool of the at least one tool works on the first workpiece in the first spindle of the at least two spindle, the first tool performs on-centerline drilling on the first workpiece in the first spindle of the at least two spindle, and the second tool performs on-centerline drilling on the second work piece in the second spindle of the remainder of the at least two spindles.

19. The method of claim 18 wherein for the eleventh mode of synchronous operations, the first tool and the second tool comprises a single double-ended drill tool.

20. The method of claim 9 further comprising the step of forming a twelfth icon representing a twelfth mode of synchronous operations wherein the first spindle of the at least two spindles is idle, and the second tool of the at least one tool and a second secondary tool of the at least one tool work on the second workpiece in at least the second spindle of the remainder of the at least two spindles.

21. The method of claim 20 further comprising the step of forming a thirteenth icon representing a thirteenth mode of synchronous operations wherein the first tool of the at least one tool works on a first workpiece in the first spindle of the at least two spindles, and the second tool of the at least one tool and the second secondary tool of the at least one tool work on a second workpiece in at least the second spindle of the remainder of the at least two spindles.

22. The method of claim 21 further comprising the step of forming a fourteenth icon representing a fourteenth mode of synchronous operations wherein the first tool of the at least one tool and the first secondary tool of the at least one tool work on the first workpiece in the first spindle of the at least two spindles, and the second tool of the at least one tool and the second secondary tool of the at least one tool work on a second workpiece in at least a second spindle of the remainder of the at least two spindles.

23. A visual method of displaying the synchronous operations of a multi-axis lathe in a graphical user interface, the multi-axis lathe having an at least two spindles and an at least two tools controlled by a CNC program, the method comprising the step of forming an iterative plurality of icons representing the modes of synchronous operations wherein the n-th mode of synchronous operation comprises the at least two tools simultaneously working on an at least two workpieces in the at least two spindles and n is a series of integers ranging from 2 to the total number of the iterative plurality of modes of synchronous operations.

* * * * *